United States Patent [19]

Gutierrez et al.

[11] Patent Number: 4,857,217

[45] Date of Patent: Aug. 15, 1989

[54] DISPERSANT ADDITIVES DERIVED FROM AMIDO-AMINES

[75] Inventors: Antonio Gutierrez, Mercerville; Robert D. Lundberg, Bridgewater, both of N.J.

[73] Assignee: Exxon Chemical Patents Inc., Linden, N.J.

[21] Appl. No.: 126,405

[22] Filed: Nov. 30, 1987

[51] Int. Cl.$^4$ .......................................... C10M 105/60
[52] U.S. Cl. ........................................ 252/47; 252/45; 252/48.2; 252/48.6; 252/50; 252/353; 252/355
[58] Field of Search ............... 550/286; 560/156, 169; 252/47, 51.5 A, 351, 353, 355, 545, 341, 48.2, 45, 48.6

[56] References Cited

U.S. PATENT DOCUMENTS

| | | | |
|---|---|---|---|
| 2,921,085 | 1/1960 | Schramm | 260/458 |
| 3,247,163 | 4/1966 | Reinking | 260/47 |
| 3,337,609 | 8/1967 | Williamson et al. | 260/482 |
| 3,340,190 | 9/1967 | Deluga | 252/33.4 |
| 4,486,791 | 5/1968 | Colyer | 252/32.7 |
| 3,417,140 | 12/1968 | McWhorter et al. | 260/561 |
| 3,445,441 | 5/1969 | Rushton | 260/89.5 |
| 3,449,362 | 6/1969 | Lee | 260/326.3 |
| 3,491,025 | 1/1970 | Lee | 252/49.6 |
| 3,509,047 | 4/1970 | Rushton | 210/54 |
| 3,514,250 | 5/1970 | Rushton | 21/2.5 |
| 3,528,928 | 9/1970 | Rushton | 252/341 |
| 3,630,902 | 12/1971 | Coupland et al. | 252/51.5 A |
| 3,873,460 | 3/1975 | Coon | 252/51.5 A |
| 3,897,456 | 7/1975 | Brewster | 260/340.2 |
| 3,903,003 | 9/1975 | Murphy et al. | 252/51.5 A |
| 4,159,957 | 7/1979 | deVries | 252/33.4 |
| 4,234,435 | 11/1980 | Meinhardt | 252/51.5 A X |
| 4,459,241 | 7/1984 | Wilson et al. | 260/502.5 E |
| 4,493,771 | 1/1985 | Wilson et al. | 210/700 |
| 4,547,562 | 10/1985 | Nichols | 528/119 |
| 4,675,374 | 6/1987 | Nichols | 528/119 |
| 4,713,189 | 12/1987 | Nalesnik | 252/51.5 A |

FOREIGN PATENT DOCUMENTS 8706228 10/1987 European Pat. Off. .

Primary Examiner—William R. Dixon, Jr.
Assistant Examiner—James M. Hunter, Jr.
Attorney, Agent, or Firm—J. B. Murray, Jr.

[57] ABSTRACT

The present invention is directed to a dispersant additive comprising at least one adduct of (A) a polyolefin of 300 to 10,000 number average molecular weight substituted with at least 0.3 (e.g., from about 1 to 4) dicarboxylic acid producing moieties (preferably acid or anhydride moieties) per polyolefin molecule, (B) an amido-amine or thioamido-amine characterized by being a reaction product of at least a polyamine and an alpha, beta-unsaturated compound of the formula:

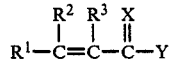

wherein X is sulfur or oxygen, Y is $-OR^4$, $-SR^4$, or $-NR^4(R^5)$, and $R^1$, $R^2$, $R^3$, $R^4$ and $R^5$ are the same or different and are hydrogen or substituted or unsubstituted hydrocarbyl.

39 Claims, No Drawings

DISPERSANT ADDITIVES DERIVED FROM AMIDO-AMINES

FIELD OF THE INVENTION

This invention relates to improved oil soluble dispersant additives useful oleaginous compositions, including fuel and lubricating oil compositions, and to concentrates containing said additives.

BACKGROUND OF THE INVENTION

U.S. Pat. No. 2,921,085 relates to the preparation of beta-aminopropionamides by reaction of an alkyl amine with an acrylate to form an alkyl aminopropionate and reaction of the latter compound with an amine. The resulting compounds are disclosed to have utility as surface active agents, specifically as emulsifying, wetting, foaming and detergent agents.

U.S. Pat. No. 3,337,609 relates to adducts of hydroxyalkyl alkylene polyamines and acrylates. The resulting adducts are added to polyepoxides to provide compositions which are suitable for use as a barrier coating for polyethylene surfaces, and for additional end uses, such as in molding. In addition, the adducts are disclosed to be useful as catalysts in resin preparation and as corrosion inhibitors in water systems for ferrous metals.

U.S. Pat. No. 3,417,140 relates to the preparation of amido-amine compositions, which are useful as epoxy resin curing agents, by reacting a polyalkylene polyamine and a fatty amine (comprising a mono- or diamine having as one of the substituents on a nitrogen atom a hydrocarbyl radical having 8 to 24 carbon atoms) with an alpha-beta unsaturated carbonylic compound. It is disclosed that this reaction occurs through the Michael addition of an amine group across the unsaturated group of the carbonylic compound and through the condensation of an amine group with the carbonylic group.

U.S. Pat. No. 3,247,163 also relates to curing agents for polyepoxide compositions, which curing agents are prepared by reacting an organic amine and an acrylate.

U.S. Pat. No. 3,445,441 relates to amino-amido polymers characterized by being a reaction product of at least a polyamine and an acrylate type compound, such as methyl or ethyl acrylate, and methyl or ethyl methacrylate. The patent states that the polymers are useful in a wide variety of applications, such as flocculating agents, water clarifying additives, corrosion inhibitors in oil and gas wells, and as lube oil additives. The patent further discloses that the polymers may be derivitized, including acylation with monocarboxylic acids and polycarboxylic acids, aliphatic dicarboxylic acids, aromatic dicarboxylic acids, for example, diglycolic, phthalic, succinic, etc., acids.

U.S. Pat. No. 3,903,003 relates to lubricating compositions containing an amido-amine reaction product of a terminally carboxylated isoprene polymer which is formed by reacting a terminally carboxylated substantially completely hydrogenated polyisoprene having an average molecular weight between about 20,000 and 250,000 and a nitrogen compound of the group consisting of polyalkylene amines and hydroxyl polyalkylene amines.

U.S. Pat. No. 4,493,771 relates to scale inhibiting with compounds containing quaternary ammonium and methylene phosphonic acid groups. These compounds are derivatives of polyamines in which the amine hydrogens have been substituted with both methylene phosphonic acid groups or their salts and hydroxypropyl quaternary ammonium halide groups. The patent discloses that any amine that contains reactive amino hydrogens can be utilized, for example, polyglycol amines, amido-amines, oxyacylated amines, and others.

U.S. Pat. No. 4,459,241 contains a similar disclosure to U.S. Pat. No. 4,493,771.

SUMMARY OF THE INVENTION

The present invention is directed to a dispersant additive comprising at least one adduct of (A) a polyolefin of 300 to 10,000 number average molecular weight substituted with at least 0.3 (e.g., from about 1 to 4) dicarboxylic acid producing moieties (preferably acid or anhydride moieties) per polyolefin molecule, and (B) an amido-amine characterized by being a reaction product of at least a polyamine and an alpha, beta unsaturated compound of the formula:

wherein X is sulfur or oxygen, Y is $-OR^4$, $-SR^4$, or $-NR^4(R^5)$, and $R^1$, $R^2$, $R^3$, $R^4$ and $R^5$ are the same or different and are hydrogen or substituted or unsubstituted hydrocarbyl.

The materials of the invention are different from the prior art because of their effectiveness and their ability to provide enhanced lubricating oil dispersancy, and in particular for their ability to provide surprising enhanced performance as judged by the commercial 5E gasoline engine performance test.

Therefore, the present invention is also directed to novel processes for preparing the dispersant adducts of this invention.

DETAILED DESCRIPTION OF THE INVENTION

PREPARATION OF CARBOXYLIC-PRODUCING REACTANT A

The long chain hydrocarbyl substituted mono or dicarboxylic acid material, i.e., acid, anhydride, or ester, [used in reactant A used in this invention] comprises long chain hydrocarbon, generally a polyolefin, substituted with an average of at least about 0.8, more typically from about 1 to 4, preferably from about 1.05 to 1.8, e.g., 1.10 to 1.6 moles, per mole of polyolefin, of an alpha or beta-unsaturated $C_4$ to $C_{10}$ dicarboxylic acid, or anhydride or ester thereof. Exemplary of such monocarboxylic acids and dicarboxylic acids, anhydrides and esters thereof are fumaric acid, itaconic acid, maleic acid, maleic anhydride, chloromaleic acid, dimethyl fumarate, chloromaleic anhydride, acrylic acid, methacrylic acid, crotonic acid, cinnamic acid, etc.

Preferred olefin polymers for reaction with the unsaturated dicarboxylic acids to form reactant A are polymers comprising a major molar amount of $C_2$ to $C_{10}$, e.g. $C_2$ to $C_5$ monoolefin. Such olefins include ethylene, propylene, butylene, isobutylene, pentene, octene-1, styrene, etc. The polymers can be homopolymers such as polyisobutylene, as well as copolymers of two or more of such olefins such as copolymers of: ethylene and propylene; butylene and isobutylene; propylene and isobutylene; etc. Other copolymers include those in which a minor molar amount of the copolymer monomers, e.g., 1 to 10 mole %, is a $C_4$ to $C_{18}$ non-conjugated diolefin, e.g., a copolymer of isobutylene and butadiene: or a copolymer of ethylene, propylene and 1,4-hexadiene; etc.

In some cases, the olefin polymer may be completely saturated, for example an ethylene-propylene copolymer made by a Ziegler-Natta synthesis using hydrogen as a moderator to control molecular weight.

The olefin polymers used in the reactant A dispersants will generally have number average molecular weights within the range of about 300 and about 10,000, preferably from about 900 to 5,000, more preferably between about 1300 and about 4,000. Particularly useful olefin polymers have number average molecular weights within the range of about 1500 and about 3000 with approximately one terminal double bond per polymer chain. An especially useful starting material for highly potent dispersant additives useful in accordance with this invention is polyisobutylene. The number average molecular weight for such polymers can be determined by several known techniques. A convenient method for such determination is by gel permeation chromatography (GPC) which additionally provides molecular weight distribution information, see W. W. Yau, J. J. Kirkland and D. D. Bly, "Modern Size Exclusion Liquid Chromatography", John Wiley and Sons, New York, 1979.

Processes for reacting the olefin polymer with the $C_{4-10}$ unsaturated dicarboxylic acid, anhydride or ester are known in the art. For example, the olefin polymer and the dicarboxylic acid material may be simply heated together as disclosed in U.S. Pat. Nos. 3,361,673 and 3,401,118 to cause a thermal "ene" reaction to take place. Or, the olefin polymer can be first halogenated, for example, chlorinated or brominated to about 1 to 8 wt. %, preferably 3 to 7 wt. % chlorine, or bromine, based on the weight of polymer, by passing the chlorine or bromine through the polyolefin at a temperature of 60° to 250° C., e.g. 120° to 160° C., for about 0.5 to 10, preferably 1 to 7 hours. The halogenated polymer may then be reacted with sufficient unsaturated acid or anhydride at 100° to 250° C., usually about 180° to 235° C., for about 0.5 to 10, e.g. 3 to 8 hours, so the product obtained will contain the desired number of moles of the unsaturated acid per mole of the halogenated polymer. Processes of this general type are taught in U.S. Pat. Nos. 3,087,436; 3,172,892; 3,272,746 and others.

Alternatively, the olefin polymer, and the unsaturated acid material are mixed and heated while adding chlorine to the hot material. Processes of this type are disclosed in U.S. Pat. Nos. 3,215,707; 3,231,587; 3,912,764; 4,110,349; 4,234,435; and in U.K. No. 1,440,219.

By the use of halogen, about 65 to 95 wt. % of the polyolefin, e.g. polyisobutylene will normally react with the dicarboxylic acid material. Upon carrying out a thermal reaction without the use of halogen or a catalyst, then usually only about 50 to 75 wt. % of the polyisobutylene will react. Chlorination helps increase the reactivity. For convenience, the aforesaid functionality ratios of dicarboxylic acid producing units to polyolefin, e.g., 1.1 to 1.8, etc. are based upon the total amount of polyolefin, that is, the total of both the reacted and unreacted polyolefin, used to make the product.

The reactant A material will be contacted with the selected reactant B amido-amine material for formation of the novel dispersants of this invention, as will be more fully explained below.

Preparation of Amido-Amine Reactant B

As described above, the amido-amine comprises a reaction product of at least a polyamine and an alpha, beta ethylenically unsaturated compound of formula (I) above.

The polyamines useful in this invention comprise polyamines, most preferably polyalkylene polyamines, of about 2 to 60, preferably 2 to 40 (e.g. 3 to 20), total carbon atoms and about 1 to 12, preferably 3 to 12, and most preferably at least 5 (e.g., 5 to 9) nitrogen atoms in the molecule. These amines may be hydrocarbyl amines or may be hydrocarbyl amines including other groups, e.g., hydroxy groups, alkoxy groups, amide groups, nitriles, imidazoline groups, and the like. Hydroxy amines with 1 to 6 hydroxy groups, preferably 1 to 3 hydroxy groups are particularly useful. Preferred amines are aliphatic saturated amines, including those of the general formulas:

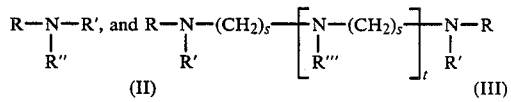

wherein R, R', R" and R''' are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; and wherein R''' can additionally comprise a moiety of the formula:

wherein R' is as defined above, and wherein s and s' can be the same or a different number of from 2 to 6, preferably 2 to 4; and t and t' can be the same or different and are numbers of from 0 to 10, preferably 2 to 7, and most preferably about 3 to 7, with the proviso that the sum of t and t' is not greater than 15. To assure a facile reaction, it is preferred that R, R', R", R''', s, s', t and t' be selected in a manner sufficient to provide the compounds of Formulas II and III with typically at least one primary or secondary amine group, preferably at least two primary or secondary amine groups. This can be achieved by selecting at least one of said R, R', R" or R''' groups to be hydrogen or by letting t in Formula III be at least one when R''' is H or when the IV moiety possesses a secondary amino group. The most preferred amine of the above formulas are represented by Formula III and contain at least two primary amine groups and at least one, and preferably at least three, secondary amine groups.

Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene)triamine; di-(1,3-propylene) triamine; N,N-dimethyl-1,3-diaminopropane; N,N-di-(2-aminoethyl) ethylene diamine; N,N-di(2-hydroxyethyl)-1,3-propylene diamine; 3-dodecyloxypropylamine; N-dodecyl-1,3-propane diamine; tris hydroxymethylaminomethane (THAM); diisopropanol amine; diethanol amine; triethanol amine; mono-, di-, and tri-tallow amines; amino morpholines such as N-(3-amino-propyl)morpholine; and mixtures thereof.

Other useful amine compounds include: alicyclic diamines such as 1,4-di(aminomethyl) cyclohexane, and heterocyclic nitrogen compounds such as imidazolines, and N-aminoalkyl piperazines of the general formula (V):

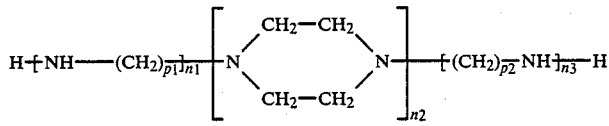

wherein $p_1$ and $p_2$ are the same or different and are each integers of from 1 to 4, and $n_1$, $n_2$ and $n_3$ are the same or different and are each integers of from 1 to 3. Non-limiting examples of such amines include 2-pentadecyl imidazoline: N-(2-aminoethyl) piperazine; etc.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and isomeric piperazines. Low cost poly(ethyleneamines) compounds averaging about 5 to 7 nitrogen atoms per molecule are available commercially under trade names such as "Polyamine H", "Polyamine 400", "Dow Polyamine E-100", etc.

Useful amines also include polyoxyalkylene polyamines such as those of the formulae:

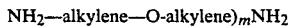     (VI)

where m has a value of about 3 to 70 and preferably 10 to 35; and

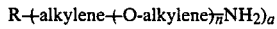     (VII)

where "n" has a value of about 1 to 40 with the provision that the sum of all the n's is from about 3 to about 70 and preferably from about 6 to about 35, and R is a polyvalent saturated hydrocarbon radical of up to ten carbon atoms wherein the number of substituents on the R group is represented by the value of "a", which is a number of from 3 to 6. The alkylene groups in either formula (VI) or (VII) may be straight or branched chains containing about 2 to 7, and preferably about 2 to 4 carbon atoms.

The polyoxyalkylene polyamines of formulas (VI) or (VII) above, preferably polyoxyalkylene diamines and polyoxyalkylene triamines, may have average molecular weights ranging from about 200 to about 4000 and preferably from about 400 to about 2000. The preferred polyoxyalkylene polyoxyalkylene· polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403", etc.

Additional amines useful in the present invention are described in U.S. Pat. No. 3,445,441, the disclosure of which is hereby incorporated by reference in its entirety.

Thus, any polyamine, whether aliphatic, cycloaliphatic, aromatic, heterocyclic, etc., can be employed provided it is capable of adding across the acrylic double bond and amidifying with for example the carbonyl group (—C(O)—) of the acrylate-type compound of formula I, or with the thiocarbonyl group (—C(S)—) of the thioacrylate-type compound of formula I.

The alpha, beta ethylenically unsaturated compounds employed in this invention comprise at least one member selected from the group consisting of alpha, beta ethylenically unsaturated compounds of the formula:

     (I)

wherein X is sulfur or oxygen, Y is —OR$^4$, —SR$^4$, or —NR$^4$(R$^5$), and R$^1$, R$^2$, R$^3$, R$^4$ and R$^5$ are the same or different and are hydrogen or substituted or unsubstituted hydrocarbyl.

When R$^1$, R$^2$, R$^3$, R$^4$ or R$^5$ are hydrocarbyl, these groups can comprise alkyl, cycloalkyl, aryl, alkaryl, aralkyl or heterocyclic, which can be substituted with groups which are substantially inert to any component of the reaction mixture under conditions selected for preparation of the amido-amine. Such substituent groups include hydroxy, halide (e.g., Cl, Fl, I, Br), —SH and alkylthio. When one or more of R$^1$ through R$^5$ are alkyl, such alkyl groups can be straight or branched chain, and will generally contain from 1 to 20, more usually from 1 to 10, and preferably from 1 to 4, carbon atoms. Illustrative of such alkyl groups are methyl, ethyl, propyl, butyl, pentyl, hexyl, heptyl, octyl, nonyl, decyl, dodecyl, tridecyl, hexadecyl, octadecyl and the like. When one or more of R$^1$ through R$^5$ are aryl, the aryl group will generally contain from 6 to 10 carbon atoms (e.g., phenyl, naphthyl).

When one or more of R$^1$ through R$^5$ are alkaryl, the alkaryl group will generally contain from about 7 to 20 carbon atoms, and preferably from 7 to 12 carbon atoms. Illustrative of such alkaryl groups are tolyl, m-ethyl-phenyl, o-ethyltolyl, and m-hexyltolyl. When one or more of R$^1$ through R$^5$ are aralkyl, the aryl component generally consists of phenyl or ($C_1$ to $C_6$) alkyl-substituted phenol and the alkyl component generally contains from 1 to 12 carbon atoms, and preferably from 1 to 6 carbon atoms. Examples of such aralkyl groups are benzyl, o-ethylbenzyl, and 4-isobutylbenzyl. When one or more of R$^1$ and R$^5$ are cycloalkyl, the cycloalkyl group will generally contain from 3 to 12 carbon atoms, and preferably from 3 to 6 carbon atoms. Illustrative of such cycloalkyl groups are cyclopropyl, cyclobutyl, cyclohexyl, cyclooctyl, and cyclododecyl. When one or more of R$^1$ through R$^5$ are heterocyclic, the heterocyclic group generally consists of a compound having at least one ring of 6 to 12 members in which on oe more ring carbon atoms is replaced by oxygen or nitrogen. Examples of such heterocyclic groups are furyl, pyranyl, pyridyl, piperidyl, dioxanyl, tetrahydrofuryl, pyrazinyl and 1,4-oxazinyl.

The alpha, beta ethylenically unsaturated carboxylate compounds employed herein have the following formula:

wherein $R^1$, $R^2$, $R^3$, and $R^4$ are the same or different and are hydrogen or substituted or unsubstituted hydrocarbyl as defined above. Examples of such alpha, beta-ethylenically unsaturated carboxylate compounds of formula VIII are acrylic acid, methacrylic acid, the methyl, ethyl, isopropyl, n-butyl, and isobutyl esters of acrylic and methacrylic acids, 2-butenoic acid, 2-hexenoic acid, 2-decenoic acid, 3-methyl-2-heptenoic acid, 3-methyl-2-butenoic acid, 3-phenyl-2-propenoic acid, 3-cyclohexyl-2-butenoic acid, 2-methyl-2-butenoic acid, 2-propyl-2-propenoic acid, 2-isopropyl-2-hexenoic acid, 2,3-dimethyl-2-butenoic acid, 3-cyclohexyl-2-methyl-2-pentenoic acid, 2-propenoic acid, methyl 2-propenoate, methyl 2-methyl 2-propenoate, methyl 2-butenoate, ethyl 2-hexenoate, isopropyl 2-decenoate, phenyl 2-pentenoate, tertiary butyl 2-propenoate, octadecyl 2-propenoate, dodecyl 2-decenoate, cyclopropyl 2,3-dimethyl-2-butenoate, methyl 3-phenyl-2-propenoate, and the like.

The alpha, beta ethylenically unsaturated carboxylate thioester compounds employed herein have the following formula:

wherein $R^1$, $R^2$, $R^3$, and $R^4$ are the same or different and are hydrogen or substituted or unsubstituted hydrocarbyl as defined above. Examples of such alpha, beta-ethylenically unsaturated carboxylate thioesters of formula IX are methylmercapto 2-butenoate, ethylmercapto 2-hexenoate, isopropylmercapto 2-decenoate, phenylmercapto 2-pentenoate, tertiary butylmercapto 2-propenoate, octadecylmercapto 2-propenoate, dodecylmercapto 2-decenoate, cyclopropylmercapto 2,3-dimethyl-2-butenoate, methylmercapto 3-phenyl-2-propenoate, methylmercapto 2-propenoate, methylmercapto 2-methyl-2-propenoate, and the like.

The alpha beta ethylenically unsaturated carboxyamide compounds employed herein have the following formula:

wherein $R^1$, $R^2$, $R^3$, $R^4$ and $R^5$ are the same or different and are hydrogen or substituted or unsubstituted hydrocarbyl as defined above. Examples of alpha, beta-ethylenically unsaturated carboxyamides of formula X are 2-butenamide, 2-hexenamide, 2decenamide, 3-methyl-2-heptenamide, 3-methyl-2-butenamide, 3-phenyl-2-propenamide, 3-cyclohexyl-2-butenamide, 2-methyl-2-butenamide, 2-propyl-2-propenamide, 2-isopropyl-2-hexenamide, 2,3-dimethyl-2-butenamide, 3-cyclohexyl-2-methyl-2-pentenamide, N-methyl 2-butenamide, N,N-diethyl 2-hexenamide, N-isopropyl 2-decenamide, N-phenyl 2-pentenamide, N-tertiary butyl 2-propenamide, N-octadecyl 2-propenamide, N-N-didodecyl 2-decenamide, N-cyclopropyl 2,3-dimethyl-2-butenamide, N-methyl 3-phenyl-2-propenamide, 2-propenamide, 2-methyl-2-propenamide, 2-ethyl-2-propenamide and the like.

The alpha, beta ethylenically unsaturated thiocarboxylate compounds employed herein have the following formula:

wherein $R^1$, $R^2$, $R^3$, $R^4$ and $R^4$ are the same or different and are hydrogen or substituted or unsubstituted hydrocarbyl as defined above. Examples of alpha, beta-ethylenically unsaturated thiocarboxylate compounds of formula XI are 2-butenthioic acid, 2-hexenthioic acid, 2-decenthioic acid, 3-methyl-2-heptenthioic acid, 3-methyl-2-butenthioic acid, 3-phenyl-2-propenthioic acid, 3-cyclohexyl-2-butenthioic acid, 2-methyl-2-butenthioic acid, 2-propyl-2-propenthioic acid, 2-isopropyl-2-hexenthioic acid, 2,3-dimethyl-2-butenthioic acid, 3-cyclohexyl-2-methyl-2-pententhioic acid, 2-propenthioic acid, methyl 2-propenthioate, methyl 2-methyl 2-propenthioate, methyl 2-butenthioate, ethyl 2-hexenthioate, isopropyl 2-decenthioate, phenyl 2-pententhioate, tertiary butyl 2-propenthioate, octadecyl 2-propenthioate, dodecyl 2-decenthioate, cyclopropyl 2,3-dimethyl-2-butenthioate, methyl 3-phenyl-2-propenthioate, and the like.

The alpha, beta ethylenically unsaturated dithioic acid and acid ester compounds employed herein have the following formula:

wherein $R^1$, $R^2$, $R^3$, and $R^4$ are the same or different and are hydrogen or substituted or unsubstituted hydrocarbyl as defined above. Examples of alpha, beta-ethylenically unsaturated dithioic acids and acid esters of formula XII are 2-butendithioic acid, 2-hexendithioic acid, 2-decendithioic acid, 3-methyl-2-heptendithioic acid, 3-methyl-2-butendithioic acid, 3-phenyl-2-propendithioic acid, 3-cyclohexyl-2-butendithioic acid, 2-methyl-2-butendithioic acid, 2-propyl-2-propendithioic acid, 2-isopropyl-2-hexendithioic acid, 2,3-dimethyl-2-butendithioic acid, 3-cyclohexyl-2-methyl-2-pentendithioic acid, 2-propendithioic acid, methyl 2-propendithioate, methyl 2-methyl 2-propendithioate, methyl 2-butendithioate, ethyl 2-hexendithioate, isopropyl 2-decendithioate, phenyl 2-pentendithioate, tertiary butyl 2-propendithioate, octadecyl 2-propendithioate, dodecyl 2-decendithioate, cyclopropyl 2,3-dimethyl-2-butendithioate, methyl 3-phenyl-2-propendithioate, and the like.

The alpha, beta ethylenically unsaturated thiocarboxyamide compounds employed herein have the following formula:

(XIII)

wherein $R^1$, $R^2$, $R^3$, $R^4$ and $R^5$ are the same or different and are hydrogen or substituted or unsubstituted hydrocarbyl as defined above. Examples of alpha, beta-ethylenically unsaturated thiocarboxyamides of formula XIII are 2-butenthioamide, 2-hexenthioamide, 2-decenthioamide, 3-methyl-2-heptenthioamide, 3-methyl-2-butenthioamide, 3-phenyl-2-propenthioamide, 3-cyclohexyl-2-butenthioamide, 2-methyl-2-butenthioamide, 2-propyl-2-propenthioamide, 2-isopropyl-2-hexenthioamide, 2,3-dimethyl-2-butenthioamide, 3-cyclohexyl-2-methyl-2-pententhioamide, N-methyl 2-butenthioamide, N,N-diethyl 2-hexenthioamide, N-isopropyl 2-decenthioamide, N-phenyl 2-pententhioamide, N-tertiary butyl 2-propenthioamide, N-octadecyl 2-propenthioamide, N-N-didodecyl 2-decenthioamide, N-cyclopropyl 2,3-dimethyl-2-butenthioamide, N-methyl 3-phenyl-2-propenthioamide, 2-propenthioamide, 2-methyl-2-propenthioamide, 2-ethyl-2-propenthioamide and the like.

Preferred compounds for reaction with the polyamines in accordance with this invention are lower alkyl esters of acrylic and (lower alkyl) substituted acrylic acid. Illustrative of such preferred compounds are compounds of the formula:

(XIV)

where $R^3$ is hydrogen or a $C_1$ to $C_4$ alkyl group, such as methyl, and $R^4$ is hydrogen or a $C_1$ to $C_4$ alkyl group, capable of being removed so as to form an amido group, for example, methyl, ethyl, propyl, isopropyl, butyl, sec-butyl, tert-butyl, aryl, hexyl, etc. e.g., propyl acrylate and propyl methacrylate. In the preferred embodiments these compounds are acrylic and methacrylic esters such as methyl or ethyl acrylate, methyl or ethyl methacrylate. When the selected alpha, beta-unsaturated compound comprises a compound of formula I wherein X is oxygen, the resulting reaction product with the polyamine contains at least one amido linkage ($-C(O)N<$) and such materials are herein termed "amido-amines." Similarly, when the selected alpha, beta unsaturated compound of formula I comprises a compound wherein X is sulfur, the resulting reaction product with the polyamine contains thioamide linkage ($-C(S)N<$) and these materials are herein termed "thioamido-amines." For convenience, the following discussion is directed to the preparation and use of amido-amines, although it will be understood that such discussion is also applicable to the thioamido-amines.

The type of amido-amine formed varies with reaction conditions. For example, a more linear amido-amine is formed where substantially equimolar amounts of the unsaturated carboxylate and polyamine are reacted. The presence of excesses of the ethylenically unsaturated reactant of formula I tends to yield an amido-amine which is more cross-linked than that obtained where substantially equimolar amounts of reactants are employed. Where for economic or other reasons a cross-linked amido-amine using excess amine is desired, generally a molar excess of the ethylenically unsaturated reactant of about at least 10%, such as 10–300% or greater, for example, 25–200%, is employed. For more efficient cross-linking an excess of carboxylated material should preferably be used since a cleaner reaction ensues. For example, a molar excess of about 10–100% or greater such as 10–50%, but preferably an excess of 30–50%, of the carboxylated material. Larger excess can be employed if desired.

In summary, without considering other factors, equimolar amounts of reactants tend to produce a more linear amido-amine whereas excess of the fomula I reactant tends to yield a more cross-linked amido-amine. It should be noted that the higher the polyamine (i.e., in greater the number of amino groups on the molecule) the greater the statistical probability of cross-linking since, for example, a tetraalkylenepentamine, such as tetraethylene pentamine

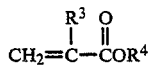

has more labile hydrogens than ethylene diamine.

These amido-amine adducts so formed are characterized by both amido and amino groups. In their simplest embodiments they may be represented by units of the following idealized formula:

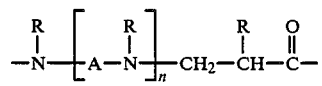

wherein the R's, which may be the same or different, are hydrogen or a substituted group, such as a hydrocarbon group, for example, alkyl, alkenyl, alkynyl, aryl, etc., and A is a moiety of the polyamine which, for example, may be aryl, cycloalkyl, alkyl, etc., and n is an integer such as 1–10 or greater. The amido-amine adducts preferably contain an average of from 1 to 3 amido groups per molecule of the amido-amine adduct.

The above simplified formula represents a linear amido-amine polymer. However, cross-linked polymers may also be formed by employing certain conditions since the polymer has labile hydrogens which can further react with either the unsaturated moiety by adding across the double bond or by amidifying with a carboxylate group.

Preferably, however, the amido-amines of this invention are not cross-linked to any substantial degree, and more preferably are substantially linear.

Preferably, the polyamine reactant contains at least one primary amine (and more preferably from 2 to 4 primary amines) group per molecule, and the polyamine and the unsaturated reactant of formula I are contacted in an amount of from about 1 to 10, more preferably from about 2 to 6, and most preferably from about 3 to 5, equivalents of primary amine in the polyamine reactant per mole of the unsaturated reactant of formula I.

The reaction between the selected polyamine and acrylate-type compound is carried out at any suitable temperature. Temperatures up to the decomposition points of reactants and products can be employed. In practice, one generally carries out the reaction by heating the reactants below 100° C., such as 80°–90° C., for a suitable period of time, such as a few hours. Where an acrylic-type ester is employed, the progress of the reaction can be judged by the removal of the alcohol in forming the amide. During the early part of the reaction alcohol is removed quite readily below 100° C. in the case of low boiling alcohols such as methanol or ethanol. As the reaction slows, the temperature is raised to push the polymerization to completion and the temperature may be raised to 150° C. toward the end of the reaction. Removal of alcohol is a convenient method of judging the progress and completion of the reaction which is generally continued until no more alcohol is evolved. Based on removal of alcohol, the yields are generally stoichiometric. In more difficult reactions, yield of at least 95% are generally obtained.

Similarly, it will be understood that the reaction of an ethylenically unsaturated carboxylate thioester of formula IX liberates the corresponding $HSR^4$ compound (e.g., $H_2S$ when $R^4$ is hydrogen) as a by-product, and the reaction of an ethylenically unsaturated carboxamide of formula X liberates the corresponding $HNR^4(R^5)$ compound (e.g., ammonia when $R^4$ and $R^5$ are each hydrogen) as by-product.

The reaction time involved can vary widely depending on a wide variety of factors. For example, there is a relationship between time and temperature. In general, lower temperature demands longer times. Usually, reaction times of from about 2 to 30 hours, such as 5 to 25 hours, and preferably 3 to 10 hours will be employed.

Although one can employ a solvent, the reaction can be run without the use of any solvent. In fact, where a high degree of cross-linking is desired, it is preferably to avoid the use of a solvent and most particularly to avoid a polar solvent such as water. However, taking into consideration the effect of solvent on the reaction, where desired, any suitable solvent can be employed, whether organic or inorganic, polar or non-polar.

As an example of the amido-amine adducts, the reaction of tetraethylene pentaamine (TEPA) with methyl methacrylate can be illustrated as follows:

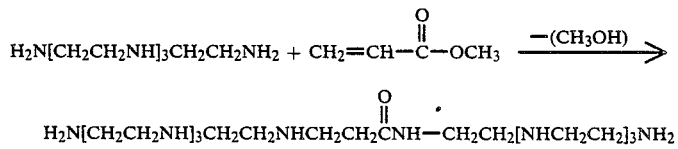

Preparation of the Dispersant

The amido-amine is readily reacted with the selected dicarboxylic acid material, e.g. alkenyl succinic anhydride, by heating an oil solution containing 5 to 95 wt. % of the dicarboxylic acid material to about 100 to 250° C., preferably 125° to 175° C., generally for 1 to 10, e.g. 2 to 6 hours until the desired amount of water is removed. The heating is preferably carried out to favor formation of imides or mixtures of imides and amides, rather than amides and salts. Generally from 1 to 5, preferably from about 1.5 to 3 moles of dicarboxylic acid moiety content (e.g., grafted maleic anhydride content) is used per equivalent of amido-amine reactant, e.g., amine.

An example of the reaction of an amido-amine reactant with a long chain dicarboxylic acid producing reactant is the reaction of polyisobutylene succinic anhydride (PIBSA) with a poly amido-amine having two terminal $-NH_2$ groups, which can be illustrated as follows:

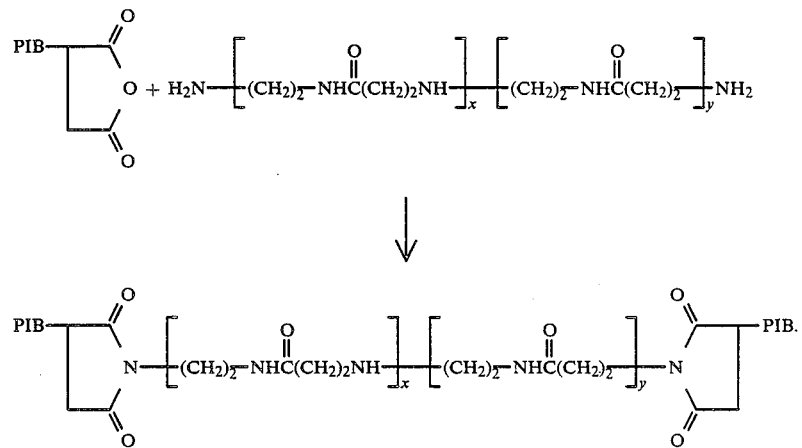

wherein x is an integer of from 0 to 20, and y is an integer of from 1 to 10, with the proviso that the sum of x+y is at least 1, e.g., 1 to 20.

It will be understood that the amido-amine reactant B can be employed alone or in admixture with any of the above described amines, such as the polyalkylene polyamines, useful in preparing the amido-amine reactant.

Preferably, the long chain substituted dicarboxylic acid producing material and amido-amine will be contacted for a time and under conditions sufficient to react substantially all of the primary nitrogens in the amido-amine reactant. The progress of this reaction can be followed by infra-red analysis.

The dispersant-forming reaction can be conducted in a polar or non-polar solvent (e.g., xylene, toluene, benzene and the like), and is preferably conducted in the presence of a mineral or synthetic lubricating oil.

The nitrogen containing dispersants can be further treated by boration as generally taught in U.S. Pat. Nos. 3,087,936 and 3,254,025 (incorporated herein by reference thereto). This is readily accomplished by treating the selected acyl nitrogen dispersant with a boron compound selected from the class consisting of boron oxide, boron halides, boron acids and esters of boron acids in an amount to provide from about 0.1 atomic proportion of boron for each mole of said acylated nitrogen composition to about 20 atomic proportions of boron for each atomic proportion of nitrogen of said acylated nitrogen composition. Usefully the dispersants of the inventive combination contain from about 0.05 to 2.0 wt. %, e.g. 0.05 to 0.7 wt. % boron based on the total weight of said borated acyl nitrogen compound. The boron, which appears to be in the product as dehydrated boric acid polymers (primarily $(HBO_2)_3$), is believed to attach to the dispersant imides and diimides as amine salts, e.g., the metaborate salt of said diimide.

Treating is readily carried out by adding from about 0.05 to 4, e.g. 1 to 3 wt. % (based on the weight of said acyl nitrogen compound) of said boron compound, preferably boric acid which is most usually added as a slurry to said acyl nitrogen compound and heating with stirring at from about 135° C. to 190°, e.g. 140°–170° C., for from 1 to 5 hours followed by nitrogen stripping at said temperature ranges. Or, the boron treatment can be carried out by adding boric acid to the hot reaction mixture of the dicarboxylic acid material and amine while removing water.

The ashless dispersants of this invention can be used alone or in admixture with other dispersants such as esters derived from the aforesaid long chain hydrocarbon substituted dicarboxylic acid material and from hydroxy compounds such as monohydric and polyhydric alcohols or aromatic compounds such as phenols and naphthols, etc. The polyhydric alcohols are the most preferred hydroxy compound and preferably contain from 2 to about 10 hydroxy radicals, for example, ethylene glycol, diethylene glycol, triethylene glycol, tetraethylene glycol, dipropylene glycol, and other alkylene glycols in which the alkylene radical contains from 2 to about 8 carbon atoms. Other useful polyhydric alcohols include glycerol, mono-oleate of glycerol, monostearate of glycerol, monomethyl ether of glycerol, pentaerythritol, dipentaerythritol, and mixtures thereof.

The ester dispersant may also be derived from unsaturated alcohols such as allyl alcohol, cinnamyl alcohol, propargyl alcohol, 1-cyclohexane-3-ol, and oleyl alcohol. Still other classes of the alcohols capable of yielding the esters of this invention comprise the ether-alcohols and amino-alcohols including, for example, the oxy-alkylene, oxy-arylene-, amino-alkylene-, and amino-arylene-substituted alcohols having one or more oxy-alkylene, amino-alkylene or amino-arylene oxy-arylene radicals. They are exemplified by Cellosolve, Carbitol, N,N,N', N'-tetrahydroxy-trimethylene diamine, and ether-alcohols having up to about 150 oxy-alkylene radicals in which the alkylene radical contains from 1 to about 8 carbon atoms.

The ester dispersant may be di-esters of succinic acids or acidic esters, i.e., partially esterified succinic acids; as well as partially esterified polyhydric alcohols or phenols, i.e., esters having free alcohols or phenolic hydroxyl radicals. Mixtures of the above illustrated esters likewise are contemplated within the scope of this invention.

The ester dispersant may be prepared by one of several known methods as illustrated for example in U.S. Pat. No. 3,381,022. The ester dispersants may also be borated, similar to the nitrogen containing dispersants, as described above.

Hydroxyamines which can be reacted with the aforesaid long chain hydrocarbon substituted dicarboxylic acid materials to form dispersants include 2-amino-1-butanol, 2-amino-2-methyl-1-propanol, p-(beta-hydroxy-ethyl)-aniline, 2-amino-1-propanol, 3-amino-1-propanol, 2-amino-2-methyl-1, 3-propane-diol, 2-amino-2-ethyl-1, 3-propanediol, N-(beta-hydroxy-propyl)-N'-(beta-amino-ethyl)-piperazine, tris(hydroxymethyl) amino-methane (also known as trismethylolaminomethane), 2-amino-1-butanol, ethanolamine, beta-(beta-hydroxyethoxy)ethylamine, and the like. Mixtures of these or similar amines can also be employed. The above description of nucleophilic reactants suitable for reaction with the hydrocarbyl substituted dicarboxylic acid or anhydride includes amines, alcohols, and compounds of mixed amine and hydroxy containing reactive functional groups, i.e., amino-alcohols.

The tris(hydroxymethyl) amino methane (THAM) can be reacted with the aforesaid acid material to form amides, imides or ester type additives as taught by U.K. No. 984,409, or to form oxazoline compounds and borated oxazoline compounds as described, for example, in U.S. Pat. Nos. 4,102,798; 4,116,876 and 4,113,639.

Other dispersants which can be employed in admixture with the novel amido-amine dispersants of this invention are those derived from the aforesaid long chain hydrocarbyl substituted dicarboxylic acid material and the aforesaid amines, such as polyalkylene polyamines, e.g., long chain hydrocarbyl substituted succinimides. Exemplary of such other dispersants are those described in co-pending Ser. No. 095,056, filed Sept. 9, 1987.

A preferred group of ashless dispersants are those derived from polyisobutylene substituted with succinic anhydride groups and reacted with amido-amine adducts formed by reacting polyethylene amines, e.g., tetraethylene pentamine, pentaethylene hexamine, polyoxyethylene and polyoxypropylene amines, e.g., polyoxypropylene diamine, trismethylolaminomethane and pentaerythritol, and combinations thereof, with an acrylate-type compound of formula (XIV) above. One particularly preferred dispersant combination involves a polyisobutene substituted with succinic anhydride groups and reacted with an amido-amine adduct which has been formed by the reaction of (1) a polyalkylene polyamine and (2) an acrylate-type reactant selected from the group consisting of lower alkyl alky-acrylates (e.g., methyl, ethyl, iso-propyl, propyl, iso-butyl, n-butyl, tert-butyl, etc., esters of methacrylic acid, acrylic acid, and the like).

The dispersants of the present invention can be incorporated into a lubricating oil in any convenient way. Thus, these mixtures can be added directly to the oil by dispersing or dissolving the same in the oil at the desired level of concentration of the dispersant. Such blending into the additional lube oil can occur at room temperature or elevated temperatures. Alternatively, the dispersants can be blended with a suitable oil-soluble solvent and base oil to form a concentrate, and then blending the concentrate with a lubricating oil basestock to obtain the final formulation. Such dispersant concentrates will typically contain (on an active ingredient (A.I.) basis) from about 3 to about 45 wt. %, and preferably from about 10 to about 35 wt. %, dispersant additive, and typically from about 30 to 90 wt. %, preferably from about 40 to 60 wt. %, base oil, based on the concentrate weight.

The lubricating oil basestock for the dispersant typically is adapted to perform a selected function by the incorporation of additional additives therein to form lubricating oil compositions (i.e., formulations).

LUBRICATING COMPOSITIONS

Lubricating oil compositions, e.g. automatic transmission fluids, heavy duty oils suitable for gasoline and diesel engines, etc., can be prepared with the additives of the invention. Universal type crankcase oils wherein the same lubricating oil compositions can be used for both gasoline and diesel engine can also be prepared. These lubricating oil formulations conventionally contain several different types of additives that will supply the characteristics that are required in the formulations. Among these types of additives are included viscosity index improvers, antioxidants, corrosion inhibitors, detergents, dispersants, pour point depressants, antiwear agents, etc.

In the preparation of lubricating oil formulations it is common practice to introduce the additives in the form of 10 to 80 wt. %, e.g. 20 to 80 wt. % active ingredient concentrates in hydrocarbon oil, e.g. mineral lubricating oil, or other suitable solvent. Usually these concentrates may be diluted with 3 to 100, e.g. 5 to 40 parts by weight of lubricating oil, per part by weight of the additive package, in forming finished lubricants, e.g. crankcase motor oils. The purpose of concentrates, of course, is to make the handling of the various materials less difficult and awkward as well as to facilitate solution or dispersion in the final blend. Thus, a dispersant would be usually employed in the form of a 40 to 50 wt. % concentrate, for example, in a lubricating oil fraction.

The ashless dispersants of the present invention will be generally used in admixture with a lube oil basestock, comprising an oil of lubricating viscosity, including natural and synthetic lubricating oils and mixtures thereof.

Natural oils include animal oils and vegetable oils (e.g., castor, lard oil) liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene oxide or propylene oxide, the alkyl and aryl ethers of these polyoxyalkylene polymers (e.g., methyl-poly isopropylene glycol ether having an average molecular weight of 1000, diphenyl ether of poly-ethylene glycol having a molecular weight of 500–1000, diethyl ether of polypropylene glycol having a molecular weight of 1000–1500); and mono- and polycarboxylic esters thereof, for example, the acetic acid esters, mixed $C_3$–$C_8$ fatty acid esters and $C_{13}$ oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety alcohols (e.g., butyl alcohol, hexyl alcohol, dodecyl alcohol, 2-ethylhexyl alcohol, ethylene glycol, diethylene glycol monoether, propylene glycol). Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol and tripentaerythritol.

Silicon-based oils such as the polyalkyl-, polyaryl-, polyalkoxy-, or polyaryloxysiloxane oils and silicate oils comprise another useful class of synthetic lubricants; they include tetraethyl silicate, tetraisopropyl silicate, tetra-(2-ethylhexyl)silicate, tetra-(4-methyl-2-ethylhexyl)silicate, tetra-(p-tert-butylphenyl)silicate, hexa-(4-methyl-2-pentoxy)disiloxane, poly(methyl)siloxanes and poly(methylphenyl)siloxanes. Other synthetic lubricating oils include liquid esters of phosphorus-containing acids (e.g., tricresyl phosphate, trioctyl phosphate, diethyl ester of decylphosphonic acid) and polymeric tetrahydrofurans.

Unrefined, refined and rerefined oils can be used in the lubricants of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques, such as distillation, solvent extraction, acid or base extraction, filtration and percolation are known to those skilled in the art. Rerefined oils are obtained by processes similar to those used to obtain refined oils applied to refined oils which have been already used in service. Such rerefined oils are also known as reclaimed or reprocessed oils and often are additionally processed by techniques for removal of spent additives and oil breakdown products.

Metal containing rust inhibitors and/or detergents are frequently used with ashless dispersants. Such detergents and rust inhibitors include the metal salts of sulphonic acids, alkyl phenols, sulphurized alkyl phenols, alkyl salicylates, naphthenates, and other oil soluble mono- and di-carboxylic acids. Highly basic, that is overbased metal salts which are frequently used as detergents appear particularly prone to interaction with the ashless dispersant. Usually these metal containing rust inhibitors and detergents are used in lubricating oil in amounts of about 0.01 to 10, e.g. 0.1 to 5 wt. %, based on the weight of the total lubricating composition. Marine diesel lubricating oils typically employ such metal-containing rust inhibitors and detergents in amounts of up to about 20 wt. %.

Highly basic alkaline earth metal sulfonates are frequently used as detergents. They were usually produced by heating a mixture comprising an oil-soluble sulfonate or alkaryl sulfonic acid, with an excess of alkaline earth metal compound above that required for complete neutralization of any sulfonic acid present and thereafter forming a dispersed carbonate complex by reacting the excess metal with carbon dioxide to provide the desired overbasing. The sulfonic acids are typically obtained by the sulfonation of alkyl substituted aromatic hydrocarbons such as those obtained from the fractionation of petroleum by distillation and/or extraction or by the alkylation of aromatic hydrocarbons as for example those obtained by alkylating benzene, toluene, xylene, naphthalene, diphenyl and the halogen derivatives such as chlorobenzene, chlorotoluene and chloronaphthalene. The alkylation may be carried out in the presence of a catalyst with alkylating agents having from about 3 to more than 30 carbon atoms. For example haloparaffins, olefins obtained by dehydrogenation of paraffins, polyolefins produced from ethylene, propylene, etc. are all suitable. The alkaryl sulfonates usually contain from about 9 to about 70 or more carbon atoms, preferably from about 16 to about 50 carbon atoms per alkyl substituted aromatic moiety.

The alkaline earth metal compounds which may be used in neutralizing these alkaryl sulfonic acids to provide the sulfonates includes the oxides and hydroxides, alkoxides, carbonates, carboxylate, sulfide, hydrosulfide, nitrate, borates and ethers of magnesium, calcium, and barium. Examples are calcium oxide, calcium hydroxide, magnesium acetate and magnesium borate. As noted, the alkaline earth metal compound is used in excess of that required to complete neutralization of the alkaryl sulfonic acids. Generally, the amount ranges from about 100 to 220%, although it is preferred to use at least 125%, of the stoichiometric amount of metal required for complete neutralization.

Various other preparations of basic alkaline earth metal alkaryl sulfonates are known, such as U.S. Pat. Nos. 3,150,088 and 3,150,089 wherein overbasing is accomplished by hydrolysis of an alkoxide-carbonate complex with the alkaryl sulfonate in a hydrocarbon solvent-diluent oil.

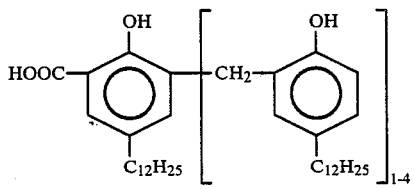

preferred alkaline earth sulfonate additive is magnesium alkyl aromatic sulfonate having a total base number ranging from about 300 to about 400 with the magnesium sulfonate content ranging from about 25 to about 32 wt. %, based upon the total weight of the additive system dispersed in mineral lubricating oil.

Neutral metal sulfonates are frequently used as rust inhibitors. Polyvalent metal alkyl salicylate and naphthenate materials are known additives for lubricating oil compositions to improve their high temperature performance and to counteract deposition of carbonaceous matter on pistons (U.S. Pat. No. 2,744,069). An increase in reserve basicity of the polyvalent metal alkyl salicylates and naphthenates can be realized by utilizing alkaline earth metal, e.g. calcium, salts of mixtures of $C_8$-$C_{26}$ alkyl salicylates and phenates (see U.S. Pat. No. 2,744,069) or polyvalent metal salts of alkyl salicyclic acids, said acids obtained from the alkylation of phenols followed by phenation, carboxylation and hydrolysis (U.S. Pat. No. 3,704,315) which could then be converted into highly basic salts by techniques generally known and used for such conversion. The reserve basicity of these metal-containing rust inhibitors is usefully at TBN levels of between about 60 and 150. Included with the useful polyvalent metal salicylate and naphthenate materials are the methylene and sulfur bridged materials which are readily derived from alkyl substituted salicylic or naphthenic acids or mixtures of either or both with alkyl substituted phenols. Basic sulfurized salicylates and a method for their preparation is shown in U.S. Pat. No. 3,595,791. Such materials include alkaline earth metal, particularly magnesium, calcium, strontium and barium salts of aromatic acids having the general formula:

$$HOOC-ArR^6-X_y(ArR_1OH)_n \qquad (XV)$$

where Ar is an aryl radical of 1 to 6 rings, $R^6$ is an alkyl group having from about 8 to 50 carbon atoms, preferably 12 to 30 carbon atoms (optimally about 12), X is a sulfur (—S—) or methylene (—CH$_2$—) bridge, y is a number from 0 to 4 and n is a number from 0 to 4.

Preparation of the overbased methylene bridged salicylate-phenate salt is readily carried out by conventional techniques such as by alkylation of a phenol followed by phenation, carboxylation, hydrolysis, methylene bridging a coupling agent such as an alkylene dihalide followed by salt formation concurrent with carbonation. An overbased calcium salt of a methylene bridged phenol-salicylic acid of the general formula (XVI):

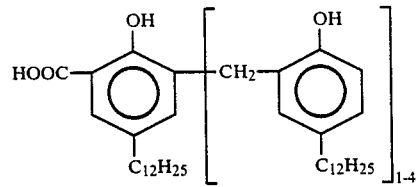

with a TBN of 60 to 150 is highly useful in this invention.

The sulfurized metal phenates can be considered the "metal salt of a phenol sulfide" which thus refers to a metal salt whether neutral or basic, of a compound typified by the general formula (XVII):

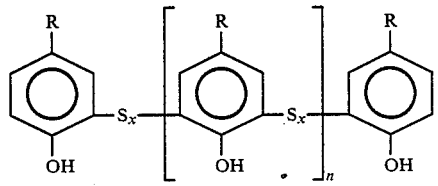

where x=1 or 2, n=0, 1 or 2; or a polymeric form of such a compound, where R is an alkyl radical, n and x are each integers from 1 to 4, and the average number of carbon atoms in all of the R groups is at least about 9 in order to ensure adequate solubility in oil. The individual R groups may each contain from 5 to 40, preferably 8 to 20, carbon atoms. The metal salt is prepared by reacting an alkyl phenol sulfide with a sufficient quantity of metal containing material to impart the desired alkalinity to the sulfurized metal phenate.

Regardless of the manner in which they are prepared, the sulfurized alkyl phenols which are useful generally contain from about 2 to about 14% by weight, preferably about 4 to about 12 wt. % sulfur based on the weight of sulfurized alkyl phenol.

The sulfurized alkyl phenol may be converted by reaction with a metal containing material including oxides, hydroxides and complexes in an amount sufficient to neutralize said phenol and, if desired, to overbase the product to a desired alkalinity by procedures well known in the art. Preferred is a process of neutralization utilizing a solution of metal in a glycol ether.

The neutral or normal sulfurized metal phenates are those in which the ratio of metal to phenol nucleus is about 1:2. The "overbased" or "basic" sulfurized metal phenates are sulfurized metal phenates wherein the ratio of metal to phenol is greater than that of stoichiometric, e.g. basic sulfurized metal dodecyl phenate has a metal content up to and greater than 100% in excess of the metal present in the corresponding normal sulfurized metal phenates wherein the excess metal is produced in oil-soluble or dispersible form (as by reaction with $CO_2$).

Magnesium and calcium containing additives although beneficial in other respects can increase the tendency of the lubricating oil to oxidize. This is especially true of the highly basic sulphonates.

According to a preferred embodiment the invention therefore provides a crankcase lubricating composition also containing from 2 to 8000 parts per million of calcium or magnesium.

The magnesium and/or calcium is generally present as basic or neutral detergents such as the sulphonates and phenates, our preferred additives are the neutral or basic magnesium or calcium sulphonates. Preferably the oils contain from 500 to 5000 parts per million of calcium or magnesium. Basic magnesium and calcium sulphonates are preferred.

As indicated earlier, a particular advantage of the novel dispersants of the present invention is use with V.I improvers to form multi-grade automobile engine lubricating oils. Viscosity modifiers impart high and low temperature operability to the lubricating oil and permit it to remain relatively viscous at elevated temperatures and also exhibit acceptable viscosity or fluidity at low temperatures. Viscosity modifiers are generally high molecular weight hydrocarbon polymers including polyesters. The viscosity modifiers may also be derivatized to include other properties or functions, such as the addition of dispersancy properties. These oil soluble viscosity modifying polymers will generally have number average molecular weights of from $10^3$ to $10^6$, preferably $10^4$ to $10^6$, e.g., 20,000 to 250,000, as determined by gel permeation chromatography or osmometry.

Examples of suitable hydrocarbon polymers include homopolymers and copolymers of two or more monomers of $C_2$ to $C_{30}$, e.g. $C_2$ to $C_8$ olefins, including both alpha olefins and internal olefins, which may be straight or branched, aliphatic, aromatic, alkyl-aromatic, cycloaliphatic, etc. Frequently they will be of ethylene with $C_3$ to $C_{30}$ olefins, particularly preferred being the copolymers of ethylene and propylene. Other polymers can be used such as polyisobutylenes, homopolymers and copolymers of $C_6$ and higher alpha olefins, atactic polypropylene, hydrogenated polymers and copolymers and terpolymers of styrene, e.g. with isoprene and/or butadiene and hydrogenated derivatives thereof. The polymer may be degraded in molecular weight, for example by mastication, extrusion, oxidation or thermal degradation, and it may be oxidized and contain oxygen. Also included are derivatized polymers such as post-grafted interpolymers of ethylene-propylene with an active monomer such as maleic anhydride which may be further reacted with an alcohol, or amine, e.g. an alkylene polyamine or hydroxy amine, e.g. see U.S. Pat. Nos. 4,089,794; 4,160,739; 4,137,185; or copolymers of ethylene and propylene reacted or grafted with nitrogen compounds such as shown in U.S. Pat. Nos. 4,068,056; 4,068,058; 4,146,489 and 4,149,984.

The preferred hydrocarbon polymers are ethylene copolymers containing from 15 to 90 wt. % ethylene, preferably 30 to 80 wt. % of ethylene and 10 to 85 wt %, preferably 20 to 70 wt. % of one or more $C_3$ to $C_{28}$, preferably $C_3$ to $C_{18}$, more preferably $C_3$ to $C_8$, alpha-olefins. While not essential, such copolymers preferably have a degree of cystallinity of less than 25 wt. %, as determined by X-ray and differential scanning calorimetry. Copolymers of ethylene and propylene are most preferred. Other alpha-olefins suitable in place of propylene to form the copolymer, or to be used in combination with ethylene and propylene, to form a terpolymer, tetrapolymer, etc., include 1-butene, 1-pentene, 1-hexene, 1-heptene, 1-octene, 1-nonene, 1-decene, etc.; also branched chain alpha-olefins, such as 4-methyl-1-pentene, 4-methyl-1-hexene, 5-methylpentene-1, 4,4-dimethyl-1-pentene, and 6-methylheptene-1, etc., and mixtures thereof.

Terpolymers, tetrapolymers, etc., of ethylene, said $C_{3-28}$ alpha-olefin, and a non-conjugated diolefin or mixtures of such diolefins may also be used. The amount of the non-conjugated diolefin generally ranges from about 0.5 to 20 mole percent, preferably from about 1 to about 7 mole percent, based on the total amount of ethylene and alpha-olefin present.

The polyester V.I. improvers are generally polymers of esters of ethylenically unsaturated $C_3$ to $C_8$ mono- and dicarboxylic acids such as methacrylic and acrylic acids, maleic acid, maleic anhydride, fumaric acid, etc.

Examples of unsaturated esters that may be used include those of aliphatic saturated mono alcohols of at least 1 carbon atom and preferably of from 12 to 20 carbon atoms, such as decyl acrylate, lauryl acrylate, stearyl acrylate, eicosanyl acrylate, docosanyl acrylate, decyl methacrylate, diamyl fumarate, lauryl methacrylate, cetyl methacrylate, stearyl methacrylate, and the like and mixtures thereof.

Other esters include the vinyl alcohol esters of $C_2$ to $C_{22}$ fatty or mono carboxylic acids, preferably saturated such as vinyl acetate, vinyl laurate, vinyl palmitate, vinyl stearate, vinyl oleate, and the like and mixtures thereof. Copolymers of vinyl alcohol esters with unsaturated acid esters such as the copolymer of vinyl acetate with dialkyl fumarates, can also be used.

The esters may be copolymerized with still other unsaturated monomers such as olefins, e.g. 0.2 to 5 moles of $C_2$–$C_{20}$ aliphatic or aromatic olefin per mole of unsaturated ester, or per mole of unsaturated acid or anhydride followed by esterification. For example, copolymers of styrene with maleic anhydride esterified with alcohols and amines are known, e.g., see U.S. Pat. No. 3,702,300.

Such ester polymers may be grafted with, or the ester copolymerized with, polymerizable unsaturated nitrogen-containing monomers to impart dispersancy to the V.I. improvers. Examples of suitable unsaturated nitrogen-containing monomers include those containing 4 to 20 carbon atoms such as amino substituted olefins as p-(beta-diethylaminoethyl)styrene; basic nitrogen-containing heterocycles carrying a polymerizable ethylenically unsaturated substituent, e.g. the vinyl pyridines and the vinyl alkyl pyridines such as 2-vinyl-5-ethyl pyridine, 2-methyl-5-vinyl pyridine, 2-vinyl-pyridine, 4-vinyl-pyridine, 3-vinyl-pyridine 3-methyl-5-vinyl-pyridine, 4-methyl-2-vinyl-pyridine, 4-ethyl-2-vinyl-pyridine and 2-butyl-1-5-vinyl-pyridine and the like.

N-vinyl lactams are also suitable, e.g. N-vinyl pyrrolidones or N-vinyl piperidones.

The vinyl pyrrolidones are preferred and are exemplified by N-vinyl pyrrolidone, N-(1-methylvinyl) pyrrolidone, N-vinyl-5-methyl pyrrolidone, N-vinyl-3, 3-dimethylpyrrolidone, N-vinyl-5-ethyl pyrrolidone, etc.

Dihydrocarbyl dithiophosphate metal salts are frequently used as anti-wear agents and also provide antioxidant activity. The zinc salts are most commonly used in lubricating oil in amounts of 0.1 to 10, preferably 0.2 to 2 wt. %, based upon the total weight of the lubricating oil composition. They may be prepared in accordance with known techniques by first forming a dithiophosphoric acid, usually by reaction of an alcohol or a phenol with $P_2S_5$ and then neutralizing the dithiophosphoric acid with a suitable zinc compound.

Mixtures of alcohols may be used including mixtures of primary and secondary alcohols, secondary generally for imparting improved anti-wear properties, with primary giving improved thermal stability properties. Mixtures of the two are particularly useful. In general, any basic or neutral zinc compound could be used but the oxides, hydroxides and carbonates are most generally employed. Commercial additives frequently contain an excess of zinc due to use of an excess of the basic zinc compound in the neutralization reaction.

The zinc dihydrocarbyl dithiophosphates useful in the present invention are oil soluble salts of dihydrocarbyl esters of dithiophosphoric acids and may be represented by the following formula:

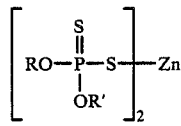

(XVIII)

wherein R and R' may be the same or different hydrocarbyl radicals containing from 1 to 18, preferably 2 to 12 carbon atoms and including radicals such as alkyl, alkenyl, aryl, aralkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-octyl, decyl, dodecyl, octadecyl, 2-ethylhexyl, phenyl, butylphenyl, cyclohexyl, methylcyclopentyl, propenyl, butenyl etc. In order to obtain oil solubility, the total number of carbon atoms (i.e. R and R' in formula XVIII) in the dithiophosphoric acid will generally be about 5 or greater. The antioxidants useful in this invention include oil soluble copper compounds. The copper may be blended into the oil as any suitable oil soluble copper compound. By oil soluble we mean the compound is oil soluble under normal blending conditions in the oil or additive package. The copper compound may be in the cuprous or cupric form. The copper may be in the form of the copper dihydrocarbyl thio- or dithio-phosphates wherein copper may be substituted for zinc in the compounds and reactions described above although one mole of cuprous or cupric oxide may be reacted with one or two moles of the dithiophosphoric acid, respectively. Alternatively the copper may be added as the copper salt of a synthetic or natural carboxylic acid. Examples include $C_{10}$ to $C_{18}$ fatty acids such as stearic or palmitic, but unsaturated acids such as oleic or branched carboxylic acids such as napthenic acids of molecular weight from 200 to 500 or synthetic carboxylic acids are preferred because of the improved handling and solubility properties of the resulting copper carboxylates. Also useful are oil soluble copper dithiocarbamates of the general formula $(RR'NCSS)_nCu$, where n is 1 or 2 and R and R' are the same or different hydrocarbyl radicals containing from 1 to 18 and preferably 2 to 12 carbon atoms and including radicals such as alkyl, alkenyl, aryl, aralkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e., R and R') will generally be about 5 or greater. Copper sulphonates, phenates, and acetylacetonates may also be used.

Exemplary of useful copper compounds are copper ($Cu^I$ and/or $Cu^{II}$) salts of alkenyl succinic acids or anhydrides. The salts themselves may be basic, neutral or acidic. They may be formed by reacting (a) any of the materials discussed above in the Ashless Dispersant section, which have at least one free carboxylic acid (or anhydride) group with (b) a reactive metal compound. Suitable acid (or anhydride) reactive metal compounds include those such as cupric or cuprous hydroxides, oxides, acetates, borates, and carbonates or basic copper carbonate.

Examples of the metal salts of this invention are Cu salts of polyisobutenyl succinic anhydride (hereinafter referred to as Cu-PIBSA), and Cu salts of polyisobutenyl succinic acid. Preferably, the selected metal employed is its divalent form, e.g., $Cu^{+2}$. The preferred substrates are polyalkenyl succinic acids in which the alkenyl group has a molecular weight greater than about 700. The alkenyl group desirably has a $\overline{M}_n$ from about 900 to 1400, and up to 2500, with a $\overline{M}_n$ of about 950 being most preferred. Especially preferred, of those listed above in the section on Dispersants, is polyisobutylene succinic acid (PIBSA). These materials may desirably be dissolved in a solvent, such as a mineral oil, and heated in the presence of a water solution (or slurry) of the metal bearing material. Heating may take place between 70° and about 200° C. Temperatures of 110° to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants (e.g., Cu-PIBSA, Cu-oleate, or mixtures thereof) will be generally employed in an amount of from about 50–500 ppm by weight of the metal, in the final lubricating or fuel composition.

The copper antioxidants used in this invention are inexpensive and are effective at low concentrations and therefore do not add substantially to the cost of the product. The results obtained are frequently better than those obtained with previously used antioxidants, which are expensive and used in higher concentrations. In the amounts employed, the copper compounds do not interfere with the performance of other components of the lubricating composition, in many instances, completely satisfactory results are obtained when the copper compound is the sole antioxidant in addition to the ZDDP. The copper compounds can be utilized to replace part or all of the need for supplementary antioxidants. Thus, for particularly severe conditions it may be desirable to include a supplementary, conventional antioxidant. However, the amounts of supplementary antioxidant required are small, far less than the amount required in the absence of the copper compound.

While any effective amount of the copper antioxidant can be incorporated into the lubricating oil composition, it is contemplated that such effective amounts be sufficient to provide said lube oil composition with an amount of the copper antioxidant of from about 5 to 500 (more preferably 10 to 200, still more preferably 10 to 180, and most preferably 20 to 130 (e.g., 90 to 120)) part per million of added copper based on the weight of the lubricating oil composition. Of course, the preferred amount may depend amongst other factors on the quality of the basestock lubricating oil.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 weight percent of a sulfide of phosphorus for $\frac{1}{2}$ to 15 hours, at a temperature in the range of 150° to 600° F. Neutralization of the phosphosulfurized hydrocarbon may be effected in the manner taught in U.S. Pat. No. 1,969,324.

Oxidation inhibitors reduce the tendency of mineral oils to deteriorate in service which deterioration can be evidenced by the products of oxidation such as sludge and varnish-like deposits on the metal surfaces and by viscosity growth. Such oxidation inhibitors include alkaline earth metal salts of alkylphenolthioesters having preferably $C_5$ to $C_{12}$ alkyl side chains, calcium nonylphenol sulfide, barium t-octylphenyl sulfide, dioctylphenylamine, phenylalphanaphthylamine, phosphosulfurized or sulfurized hydrocarbons, etc.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxy-alkylene hydrocarbyl succinimide, S-carboxy-alkylene hydrocarbyl succinamic acid and mixtures thereof; U.S. Pat. No. 3,879,306 which discloses N-(hydroxy-alkyl) alkenyl-succinamic acids or succinimides; U.S. Pat. No. 3,932,290 which discloses reaction products of di-(lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. The most preferred friction modifiers are glycerol mono and dioleates, and succinate esters, or metal salts thereof, of hydrocarbyl substituted succinic acids or anhydrides and thiobis alkanols such as described in U.S. Pat. No. 4,344,853.

Pour point depressants lower the temperature at which the fluid will flow or can be poured. Such depressants are well known. Typical of those additives which usefully optimize the low temperature fluidity of the fluid are $C_8$–$C_{18}$ dialkylfumarate vinyl acetate copolymers, polymethacrylates, and wax naphthalene.

Foam control can be provided by an antifoamant of the polysiloxane type, e.g. silicone oil and polydimethyl siloxane.

Organic, oil-soluble compounds useful as rust inhibitors in this invention comprise nonionic surfactants such as polyoxyalkylene polyols and esters thereof, and anionic surfactants such as salts of alkyl sulfonic acids. Such anti-rust compounds are known and can be made by conventional means. Nonionic surfactants, useful as anti-rust additives in the oleaginous compositions of this invention, usually owe their surfactant properties to a number of weak stabilizing groups such as ether linkages. Nonionic anti-rust agents containing ether linkages can be made by alkoxylating organic substrates containing active hydrogens with an excess of the lower alkylene oxides (such as ethylene and propylene oxides) until the desired number of alkoxy groups have been placed in the molecule.

The preferred rust inhibitors are polyoxyalkylene polyols and derivatives thereof. This class of materials are commercially available from various sources: Pluronic Polyols from Wyandotte Chemicals Corporation; Polyglycol 112-2, a liquid triol derived from ethylene oxide and propylene oxide available from Dow Chemical Co.; and Tergitol, dodecylphenyl or monophenyl polyethylene glycol ethers, and Ucon, polyalkylene glycols and derivatives, both available from Union Carbide Corp. These are but a few of the commercial products suitable as rust inhibitors in the improved composition of the present invention.

In addition to the polyols per se, the esters thereof obtained by reacting the polyols with various carboylic acids are also suitable. Acids useful in preparing these esters are lauric acid, stearic acid, succinic acid, and alkyl- or alkenyl-substituted succinic acids wherein the alkyl-or alkenyl group contains up to about twenty carbon atoms.

The preferred polyols are prepared as block polymers. Thus, a hydroxy-substituted compound, R—(OH)n (wherein n is 1 to 6, and R is the residue of a mono- or polyhydric alcohol, phenol, naphthol, etc.) is reacted with propylene oxide to form a hydrophobic base. This base is then reacted with ethylene oxide to provide a hydrophylic portion resulting in a molecule having both hydrophobic and hydrophylic portions. The relative sizes of these portions can be adjusted by regulating the ratio of reactants, time of reaction, etc., as is obvious to those skilled in the art. Thus it is within the skill of the art to prepare polyols whose molecules are characterized by hydrophobic and hydrophylic moieties which are present in a ratio rendering rust inhibitors suitable for use in any lubricant composition regardless of differences in the base oils and the presence of other additives.

If more oil-solubility is needed in a given lubricating composition, the hydrophobic portion can be increased and/or the hydrophylic portion decreased. If greater oil-in-water emulsion breaking ability is required, the hydrophylic and/or hydrophobic portions can be adjusted to accomplish this.

Compounds illustrative of R—(OH)n include alkylene polyols such as the alkylene glycols, alkylene triols, alkylene tetrols, etc., such as ethylene glycol, propylene glycol, glycerol, pentaerythritol, sorbitol, mannitol, and the like. Aromatic hydroxy compounds such as alkylated mono- and polyhydric phenols and naphthols can also be used, e.g., heptylphenol, dodecylphenol, etc.

Other suitable demulsifiers include the esters disclosed in U.S. Pat. Nos. 3,098,827 and 2,674,619.

The liquid polyols available from Wyandotte Chemical Co. under the name Pluronic Polyols and other similar polyols are particularly well suited as rust inhibitors. These Pluronic Polyols correspond to the formula:

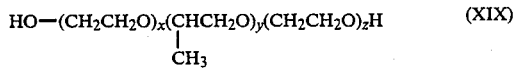

(XIX)

wherein x,y, and z are integers greater than 1 such that the —$CH_2CH_2O$— groups comprise from about 10% to about 40% by weight of the total molecular weight of the glycol, the average molecule weight of said glycol being from about 1000 to about 5000. These products are prepared by first condensing propylene oxide with propylene glycol to produce the hydrophobic base

(XX)

This condensation product is then treated with ethylene oxide to add hydrophylic portions to both ends of the molecule. For best results, the ethylene oxide units should comprise from about 10 to about 40% by weight of the molecule. Those products wherein the molecular weight of the polyol is from about 2500 to 4500 and the ethylene oxide units comprise from about 10% to about 15% by weight of the molecule are particularly suitable. The polyols having a molecular weight of about 4000 with about 10% attributable to ($CH_2CH_2O$) units are particularly good. Also useful are alkoxylated fatty amines, amides, alcohols and the like, including such alkoxylated fatty acid derivatives treated with $C_9$ to $C_{16}$ alkyl-substituted phenols (such as the mono- and di-heptyl, octyl, nonyl, decyl, undecyl, dodecyl and tridecyl phenols), as described in U.S. Pat. No. 3,849,501, which is also hereby incorporated by reference in its entirety.

These compositions of our invention may also contain other additives such as those previously described, and other metal containing additives, for example, those containing barium and sodium.

The lubricating composition of the present invention may also include copper lead bearing corrosion inhibitors. Typically such compounds are the thiadiazole polysulphides containing from 5 to 50 carbon atoms, their derivatives and polymers thereof. Preferred materials are the derivatives of 1,3,4 thiadiazoles such as those described in U.S. Pat. Nos. 2,719,125; 2,719,126; and 3,087,932; especially preferred is the compound 2,5 bis (t-octadithio)-1,3,4 thiadiazole commercially available as Amoco 150. Other similar materials also suitable are described in U.S. Pat. Nos. 3,821,236; 3,904,537; 4,097,387; 4,107,059; 4,136,043; 4,188,299; and 4,193,882.

Other suitable additives are the thio and polythio sulphenamides of thiadiazoles such as those described in U.K. Patent Specification No. 1,560,830. When these compounds are included in the lubricating composition, we prefer that they be present in an amount from 0.01 to 10, preferably 0.1 to 5.0 weight percent based on the weight of the composition.

Some of these numerous additives can provide a multiplicity of effects, e.g. a dispersant-oxidation inhibitor. This approach is well known and need not be further elaborated herein.

Compositions when containing these conventional additives are typically blended into the base oil in amounts effective to provide their normal attendant function. Representative effective amounts of such additives (as the respective active ingredients) in the fully formulated oil are illustrated as follows:

| Compositions | Wt. % A.I. (Preferred) | Wt. % A.I. (Broad) |
| --- | --- | --- |
| Viscosity Modifier | .01–4 | 0.01–12 |
| Detergents | 0.01–3 | 0.01–20 |
| Corrosion Inhibitor | 0.01–1.5 | .01–5 |
| Oxidation Inhibitor | 0.01–1.5 | .01–5 |
| Dispersant | 0.1–8 | .1–20 |
| Pour Point Depressant | 0.01–1.5 | .01–5 |
| Anti-Foaming Agents | 0.001–0.15 | .001–3 |
| Anti-Wear Agents | 0.001–1.5 | .001–5 |
| Friction Modifiers | 0.01–1.5 | 01–5 |
| Mineral Oil Base | Balance | Balance |

When other additives are employed, it may be desirable, although not necessary, to prepare additive concentrates comprising concentrated solutions or dispersions of the novel dispersants of this invention (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the additives in proper amounts to provide the desired concentration in the final formulation when the additive-package is combined with a predetermined amount of base lubricant. Thus, the dispersants of the present invention can be added to small amounts of base oil or other compatible solvents along with other desirable additives to form additive-packages containing active ingredients in collective amounts of typically from about 2.5 to about 90%, and preferably from about 15 to about 75%, and most preferably from about 25 to about 60% by weight additives in the appropriate proportions with the remainder being base oil.

The final formulations may employ typically about 10 wt. % of the additive-package with the remainder being base oil.

All of said weight percents expressed herein (unless otherwise indicated) are based on active ingredient (A.I.) content of the additive, and/or upon the total weight of any additive-package, or formulation which will be the sum of the A.I. weight of each additive plus the weight of total oil or diluent.

This invention will be further understood by reference to the following examples, wherein all parts are parts by weight, unless otherwise noted and which include preferred embodiments of the invention. In the Examples, SA:PIB ratios are based upon the total PIB charged to the reactor as starting material, i.e., both the PIB which reacts and the PIB which remains unreacted.

PREPARATION OF POLYISOBUTYLENE SUCCINIC ANHYDRIDE (PIBSA)

EXAMPLE 1

A polyisobutenyl succinic anhydride having a succinic anhydride (SA) to polyisobutenylene mole ratio (i.e., a SA:PIB ratio) of 1.04 is prepared by heating a mixture of 100 parts of polyisobutylene (940 $\overline{M}_n$; $\overline{M}_w/\overline{M}_n \sim 2.5$) with 13 parts of maleic anhydride to a temperature of about 220° C. When the temperature reaches 120° C., the chlorine addition is begun and 10.5 parts of chlorine at a constant rate are added to the hot mixture for about 5.5 hours. The reaction mixture is then heat soaked at 220° C. for about 1.5 hours and then stripped with nitrogen for about one hour. The resulting polyisobutenyl succinic anhydride has an ASTM Saponification Number of 112. The PIBSA product is 90 wt. % active ingredient (A.I.), the remainder being primarily unreacted PIB.

EXAMPLE 2

A polyisobutenyl succinic anhydride (PIBSA) having a SA:PIB ratio of 1.24, is prepared by heating a mixture of 100 parts of polyisobutylene (1320 $\overline{M}_n$; $\overline{M}_w/\overline{M}_n \sim 2.5$) with 11 parts of maleic anhydride to a temperature of about 220° C. When the temperature reaches 120° C., the chlorine addition is begun and 10 parts of chlorine at a constant rate are added to the hot mixture for about 5 hours. The reaction mixture is then heat soaked at 220° C. for about 1.5 hours and then stripped with nitrogen for about one hour. The resulting polyisobutenyl succinic anhydride was diluted with S150 mineral oil to obtain a product having an ASTM Saponification Number of 69. The PIBSA product is 59 wt. % active ingredient (A.I.), the remainder being primarily unreacted PIB and mineral oil.

EXAMPLE 3

A polyisobutenyl succinic anhydride having a SA:-PIB ratio of 1.13 is prepared by heating a mixture of 100 parts or polyisobutylene (2225 $\overline{M}_n$; $\overline{M}_w/\overline{M}_n \sim 2.5$) with 6.14 parts of maleic anhydride to a temperature of about 220° C. When the temperature reaches 120° C., the chlorine addition is begun and 5.07 parts of chlorine at a constant rate are added to the hot mixture for about 5.5 hours. The reaction mixture is then heat soaked at 220° C. for about 1.5 hours and then stripped with nitrogen for about one hour. The resulting polyisobutenyl succinic anhydride has an ASTM Saponification Number of 54. The PIBSA product is 80 wt. % active ingredient (A.I.), the remainder being primarily unreacted PIB.

PREPARATION OF DISPERSANTS

A series of dispersants were prepared by reacting the selected PIBSA, prepared as in Examples 1-3 above, with one of two amido-amines or with a polyalkylene polyamine, tetraethylene pentamine (TEPA). Amidoamine I is prepared by reacting TEPA with methyl acrylate at a 2:1 TEPA:methyl acrylate molar ratio, to form a product mixture having 30.1 wt. % total N, 8.2 wt. % primary N, and containing about 50 wt. % unreacted TEPA. Amido-amine II is prepared similarly, except that a 1.5:1 TEPA:methyl acrylate molar ratio is employed, to form a product mixture containing 28.3 wt. % total N, 6.1 wt. % primary N, and about 25 wt. % unreacted TEPA.

The amination reactions were carried out as follows:

EXAMPLE 4

A mixture of 200 parts by weight of the PIBSA product formed in Example 1 and 188 parts of S150 mineral oil was heated to 150° C. under $N_2$. Then 32.3 parts of amido-amine I were added dropwise while stirring and light nitrogen sparging. The mixture was nitrogen stripped at 150° C. for 3 hours and then filtered. The oil solution was found to have the nitrogen content of 2.37 wt. % and a kinematic viscosity of 107.4 cSt at 100° C.

EXAMPLE 5

A mixture of 200 parts by weight of the PIBSA product formed in Example 1 and 200 parts of S150 mineral oil was heated to 150° C. under $N_2$. Then 43.4 parts of amido-amine II were added dropwise while stirring and light nitrogen sparging. The mixture was nitrogen stripped at 150° C. for 3 hours and then filtered. The oil solution was found to have the nitrogen content of 2.86 wt. % and a kinematic viscosity of 135.7 cSt at 100° C.

EXAMPLE 6

A mixture of 200 parts by weight of the PIBSA product formed in Example 2 and 55 parts of S150 mineral oil was heated to 150° C. under $N_2$. Then 21 parts of amido-amine I were added dropwise while stirring and light nitrogen sparging. The mixture was nitrogen stripped at 150° C. for 3 hours and then filtered. The oil solution was found to have the nitrogen content of 2.39 wt. % and a kinematic viscosity of 220.8 cSt at 100° C.

EXAMPLE 7

A mixture of 200 parts by weight of the PIBSA product formed in Example 2 and 62 parts of S150 mineral oil was heated to 150° C. under $N_2$. Then 28.2 parts of amido-amine II were added dropwise while stirring and light nitrogen sparging. The mixture was nitrogen stripped at 150° C. for 3 hours and then filtered. The oil solution was found to have the nitrogen content of 2.86 wt. % and a kinematic viscosity of 207.4 cSt at 100° C.

EXAMPLE 8

A mixture of 200 parts by weight of the PIBSA product formed in Example 3 and 126 parts of S150 mineral oil was heated to 150° C. under $N_2$. Then 15.9 parts of amido-amine I were added dropwise while stirring and light nitrogen sparging. The mixture was nitrogen stripped at 150° C. for 3 hours and then filtered. The oil solution was found to have the nitrogen content of 1.51 wt. % and a kinematic viscosity of 494.1 cSt at 100° C.

EXAMPLE 9

A mixture of 200 parts by weight of the PIBSA product formed in Example 3 and 132 parts of S150 mineral oil was heated to 150° C. under $N_2$. Then 21.3 parts of amido-amine II were added dropwise while stirring and light nitrogen sparging. The mixture was nitrogen stripped at 150° C. for 3 hours and then filtered. The oil solution was found to have the nitrogen content of 1.83 wt. % and a kinematic viscosity of 484.2 cSt at 100° C.

COMPARATIVE EXAMPLE A

A mixture of 200 parts by weight of the PIBSA product formed in Example 1 and 174.5 parts of S150 mineral oil was heated to 150° C. under $N_2$. Then 17.9 parts of tetraethylenepentaamine were added dropwise while stirring and light nitrogen sparging. The mixture was nitrogen stripped at 150° C. for 3 hours and then filtered. The oil solution was found to have the nitrogen content of 1.72 wt. % and a kinematic viscosity of 156.3 cSt at 100° C.

COMPARATIVE EXAMPLE B

A mixture of 200 parts by weight of the PIBSA product formed in Example 2 and 42 parts of S150 mineral oil was heated to 150° C. under $N_2$. Then 11.6 parts of tetraethylenepentaamine were added dropwise while stirring and light nitrogen sparging. The mixture was nitrogen stripped at 150° C. for 3 hours and then filtered. The oil solution was found to have the nitrogen content of 1.65 wt. % and a kinematic viscosity of 213.0 cSt at 100° C.

COMPARATIVE EXAMPLE C

A mixture of 200 parts by weight of the PIBSA product formed in Example 3 and 119 parts of S150 mineral oil was heated to 150° C. under $N_2$. Then 8.8 parts of tetraethylenepentaamine were added dropwise while stirring and light nitrogen sparging. The mixture was nitrogen stripped at 150° C. for 3 hours and then filtered. The oil solution was found to have the nitrogen content of 1.05 wt. % and a kinematic viscosity of 487.8 cSt at 100° C.

The product dispersants thereby obtained are summarized as set forth in Table I below.

TABLE I

| Example No. | PIB Mn | Amine | % N | VIS 100° C., cSt |
|---|---|---|---|---|
| 4 | 940 | Amido-amine I | 2.37 | 107.4 |
| 5 | 940 | Amido-amine II | 2.86 | 135.2 |
| Compar. A | 940 | TEPA | 1.72 | 156.3 |
| 6 | 1300 | Amido-amine I | 2.39 | 220.8 |
| 7 | 1300 | Amido-amine II | 2.86 | 207.4 |
| Compar. B | 1300 | TEPA | 1.65 | 213.0 |
| 8 | 2250 | Amido-amine I | 1.51 | 494.1 |
| 9 | 2250 | Amido-amine II | 1.83 | 484.2 |
| Compar. C | 2250 | TEPA | 1.05 | 487.8 |

The following lubricating oil compositions were prepared using the dispersants of Examples 4–9, and Comparative Examples A, B and C. The resulting compositins were then tested for sludge inhibition (via the SIB test) and varnish inhibition (via the VIB test), as described below.

The SIB test has been found, after a large number of evaluations, to be an excellent test for assessing the dispersing power of lubricating oil dispersant additives.

The medium chosen for the SIB test was a used crankcase mineral lubricating oil composition having an original viscosity of about 325 SUS at 38° C. that had been used in a taxicab that was driven generally for short trips only, thereby causing a buildup of a high concentration of sludge precursors. The oil that was used contained only a refined base mineral lubricating oil, a viscosity index improver, a pour point depressant and zinc dialkyldithiophosphate anti-wear additive. The oil contained no sludge dispersant. A quantity of such used oil was acquired by draining and refilling the taxicab crankcase at 1000–2000 mile intervals.

The SIB test is conducted in the following manner: the aforesaid used crankcase oil, which is milky brown in color, is freed of sludge by centrifuging for one hour at about 39,000 gravities (gs.). The resulting clear bright red supernatant oil is then decanted from the insoluble sludge particles thereby separated out. However, the supernatant oil still contains oil-soluble sludge precursors which on heating under the conditions employed by this test will tend to form additional oil-insoluble deposits of sludge. The sludge inhibiting properties of the additives being tested are determined by adding to portions of the supernatant used oil, a small amount, such as 0.5, 1 or 2 weight percent, of the particular additive being tested. Ten grams of each blend being tested are placed in a stainless steel centrifuge tube and are heated at 135° C. for 16 hours in the presence of air. Following the heating, the tube containing the oil being tested is cooled and then centrifuged for about 30 minutes at room temperature at about 39,000 gs. Any deposits of new sludge tat form in this step are separated from the oil by decanting the supernatant oil and then carefully washing the sludge deposits with 25 ml of heptane to remove all remaining oil from the sludge and further centrifuging. The weight of the new solid sludge that has been formed in the test, in milligrams, is determined by drying the residue and weighing it. The results are reported as amount of precipitated sludge in comparison with the precipitated sludge of a blank not containing any additional additive, which blank is normalized to a rating of 10 . The less new sludge precipitated in the presence of the additive, the lower the SIB value and the more effective is the additive as a sludge dispersant. In other words, if the additive gives half as much precipitated sludge as the blank, then it would be rated 5.0 since the blank will be normalized to 10.

The VIB test was used to determine varnish inhibition. Here, each test sample consisted of 10 grams of lubricating oil containing a small amount of the additive being tested. The test oil to which the additive is admixed is of the same type as used in the above-described SIB test. Each ten gram sample was heat soaked overnight at about 140° C. and thereafter centrifuged to remove the sludge. The supernatant fluid of each sample was subjected to heat cycling from about 150° C. to room temperature over a period of 3.5 hours at a frequency of about 2 cycles per minute. During the heating phase, gas which was a mixture of about 0.7 volume percent $SO_2$, 1.4 volume percent NO and balance air was bubbled through the test samples. During the cooling phase, water vapor was bubbled through the test samples. At the end of the test period, which testing cycle can be repeated as necessary to determine the inhibiting effect of any additive, the wall surfaces of the test flasks in which the samples were contained are visually evaluated as to the varnish inhibition. The amount of varnish imposed on the walls is rated to values of from 1 to 11 with the higher number being the greater amount of varnish, in comparison with a blank with no additive that was rated 11.

10.00 grams of SIB test oil were mixed with 0.05 grams of the products of the Examples as described in Table II and tested in the aforedescribed SIB and VIB tests.

The test results are summarized below in Table II.

TABLE II

| Example No. | PIB MW | Amine | SIB | VIB |
|---|---|---|---|---|
| 4 | 940 | Amido-amine I | 2.50 | 6 |
| 5 | 940 | Amido-amine II | 2.31 | 4 |
| Compar. A | 940 | TEPA | 4.00 | 8 |
| 6 | 1300 | Amido-amine I | 1.50 | 6 |
| 7 | 1300 | Amido-amine II | 1.00 | 4 |
| Compar. B | 1300 | TEPA | 2.63 | 8 |
| 8 | 2250 | Amido-amine I | 3.06 | 4 |
| 9 | 2250 | Amido-amine II | 2.94 | 3 |
| Compar. C | 2250 | TEPA | 3.81 | 5½ |

The above data show that the dispersants of this invention, prepared from amido-amines, have comparable viscosities to the control, excellent SIB/VIB performance and provide superior sludge and varnish inhibiting properties.

EXAMPLE 10

A mixture of 1551 parts by weight of the PIBSA product formed in Example 3 and 1181 parts of S150 mineral oil was heated to 150° C. under $N_2$. Then 150 parts of amido-amine II were added dropwise while stirring and light nitrogen sparging. The mixture was nitrogen stripped at 150° C. for 3 hours and then filtered. The oil solution was found to have the nitrogen content of 1.51 wt. % and a kinematic viscosity of 473.4 cSt at 100° C.

COMPARATIVE EXAMPLE D

A mixture of 1800 parts by weight of the PIBSA product formed in Example 3 and 1163 parts of S150 mineral oil was heated to 150° C. under $N_2$. Then 94 parts of tetraethylenepentaamine were added dropwise while stirring and light nitrogen sparging for 1 hour. The mixture was nitrogen stripped at 150° C. for 1.5 hours. 39.5 parts of boric acid are added over 1.5 hours while stirring at 163° C. followed by $N_2$ stripping for 2 hours, cooling and filtering. The oil solution was found to have the nitrogen content of 0.97 wt. %, a boron content of 0.28 wt. % and a kinematic viscosity of 896 cSt at 100° C.

A series of lubricating formulations were prepared in which the dispersant comprised either the dispersant of Example 10 employing amido-amine II, or the dispersant of Comparative Example D. Lubricating composition A contained 5.5 vol. % of the dispersant product mixture formed in Example 10. Lubricating composition B contained 6.05 vol. % of the comparative dispersant product mixture formed in Comparative Example D. Each lubricating composition also contained in equal proportions, mineral lubricating oil, a mixture of overbased Mg sulfonate detergent inhibitor and overbased Ca sulfonate detergent inhibitor, zinc dialkyl dithiophosphate antiwear agent, antioxidant and ethylene propylene viscosity index improver.

Lubricants A and B were tested in a MS sequence VE Engine Test. The test is carried out in a 2.3 liter (140 C.I.D.) 1985 Ford 4-cylinder engine with fuel injection under test conditions which simulate "stop and go" city driving and moderate temperature operations. This engine features an overhead camshaft, hydraulic lash adjusters, metric dimensioning, a die cast aluminum intake manifold, and a fast burn cylinder head. It is operated with leaded Phillips "J" fuel in three stages. During Stage I, the engine is operated for 120 minutes at moderate power output with moderate oil and water temperatures and a slightly leaner than stoichiometric (14.3) air/fuel ratio (A/F). Stage II operates for an additional 75 minutes at higher oil and water temperatures. During Stage III, the engine is operated for 45 minutes at low rpm, with low oil and water temperatures, and with a rich A/F. Forty-eight cycles of four hour duration are run until 192 hours are accumulated. At each sixth cycle, Stage III is modified to provide for oil leveling. At the end of each test, the engine is completely dissassembled to determine the extent of wear, sludge, varnish and valve deposits. In addition, clogging of the PCV valve and oil screen are determined. Various parts of the engine are rated on a merit basis of 0 to 10, wherein 10 represents a perfectly clean part while the lesser numbers represent increasing degrees of deposit formation. The various ratings are then totaled and averaged on a basis of 10 as a perfect rating. Cleanliness results obtained with the compositions described above are given in Table III.

TABLE III

MS Sequence VE Test Results
10W40 Lubricants

| | A (Invention) | B (Control) |
|---|---|---|
| SLUDGE DEPOSITS | | |
| Rocker Arm Cover | 8.26 | 7.64 |
| Front Seal Housing | 9.48 | 9.36 |
| Oil Pan | 9.16 | 8.48 |
| Valve Deck Area | 9.40 | 8.90 |
| Underside of Block | 9.43 | 9.40 |
| Cam Cover Baffle | 9.38 | 9.13 |
| Avg. Sludge (6 parts) | 9.18 | 8.82 |
| CLOGGING | | |
| Oil Ring % | 0 | 0 |
| Oil Screen, % | 0 | 11 |
| PCV Valve at 18 in. | 0.8 | 7.9 |
| PCV Valve at 8 in. | 0 | 2.8 |
| Cam Lobe Oil Holes, # | 0 | 0 |
| Oil Screen Deposits Other Than Sludge, % | 3.0 | 4.0 |
| VARNISH DEPOSITS | | |
| Piston Skirts | 6.81 | 7.32 |
| Rocker Arm Cover (Jacketed) | 4.64 | 3.76 |
| Camshaft Baffle (Extended) | 7.18 | 6.89 |
| Cylinder Wall (BRT) | 3.94 | 3.30 |
| Oil Pan (Modified) | 6.18 | 6.89 |
| Avg. Varnish | 5.75 | 5.63 |
| WEAR | | |
| Top Ring Gap Inc. Max. Mils. | 10.0 | 15.0 |
| Top Ring Gap Inc. Avg. Mils. | 7.5 | 11.0 |
| Rod Brg. Wt. Loss, Max. Mg. | 61.8 | 143.2 |
| Rod Brg. Wt. Loss, Avg. Mg. | 53.1 | 105.0 |
| Follower Wt. Loss, Max. Mg. | 9.4 | 471.1 |
| Follower Wt. Loss, Avg. Mg. | 6.7 | 291.8 |
| Cam Lobe Wear, Max. Mils. | 0.70 | 16.5 |
| Cam Lobe Wear, Avg. Mils. | 0.59 | 9.28 |
| ADDITIONAL RATINGS | | |
| Stuck Comp. Rings, # | 0 | 0 |
| Stuck Oil Rings, # | 0 | 0 |
| Stuck Lash Adj. Bodies # | 8 | 5 |
| Oil Consumption, Quarts | 0.78 | 0.75 |

Lubricant C was similar to Lubricant A except that it was a 10W30 crankcase oil containing 6.0 vol. % of the dispersant product of Example 10. Lubricant C also required a lesser amount of the viscosity index improver due to its 10W30 viscosity requirements. Lubricant D was similar to Lubricant C except that it contained 6.0 vol. % of the Comparative Example D dispersant concentrate used in Lubricant B.

Lubricants C and D were tested in a Caterpillar 1-H2 Test, but for 120 hours rather than the full 480 hour test described in ASTM Document for Single Cylinder Engine Test for Evaluating the Performance of Crankcase Lubricants, Caterpillar 1-H2 Test Method, Part 1, STP 509A. This test evaluates the ability of diesel lubricants to curtail accumulation of deposits on the piston when operating in high severity diesel engines.

The results are shown in Table IV.

TABLE IV

| Caterpillar 1-H2 Test - 120 Hours 10W30 Lubricants | | |
|---|---|---|
| | C (Invention) | D (Comparative) |
| WTD | 98 | 132 |
| TGF | 25 | 31 |

Table IV shows that the dispersant of the invention prepared as in Example 10 used in Lubricant C was superior in top groove fill (TGF) and weighed total demerits (WTD), i.e., superior in decreased deposits, compared with the known dispersant of Comparative Example D which was used in Lubricant D.

EXAMPLE 11

Preparation of Amido Amine

To a stirred reaction vessel was added 1.5 moles of tetraethylenepentamine (TEPA) at room temperature, followed by 1 mole of ethyl acrylate, under a $N_2$ blanket. The resulting exothermic reaction raised the reaction mass' temperature to about 75° C. Then an infra-red analysis (IR) was made of the reaction mass, which showed the disappearance of the double bond of the ethyl acrylate, but revealed ester groups to be still present. A gas chromatographic analysis of the reaction mass was also then taken, which showed unreacted TEPA still present.

An esterification catalyst, stannous octanoate, was then added (1 drop) to the reaction mass, and the temperature of the reaction vessel was increased to 130 to 135° C. with mild $N_2$ sweeping. The by-product alcohol (ethanol) was removed as a vapor from the reaction vessel with the sweep $N_2$, and the progress of the reaction was followed by IR until the ester absorption band disappeared. The reaction mass was stirred for additional 1 hour at 130° to 135° C. to ensure completion of the reaction. A total reaction time of 6 hours was used. The resulting product mixture containing the amidoamine was analyzed and was found to contain 4.8 milliequivalents of primary amine per gram of amido-amine and a nitrogen content of 30.1 wt. %.

EXAMPLE 12

The procedure of Example 11 was repeated except that the esterification catalyst comprised titanium tetrabutoxide, and similar results were obtained.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An oil soluble dispersant mixture useful as an oil additive comprising an adduct of:
   (A) a long chain hydrocarbyl substituted $C_4$ to $C_{10}$ monounsaturated dicarboxylic acid producing material formed by reacting an olefin polymer of $C_2$ to $C_{10}$ monoolefin having a number average molecular weight of about 300 to 10,000 and a $C_4$ to $C_{10}$ monounsaturated acid material, said acid producing material having an average of at least about 0.8 dicarboxylic acid producing moieties, per molecule of said olefin polymer present in the reaction mixture used to form said acid producing material; and
   (B) an amido-amine or a thioamido-amine by being a reaction product of at least a polyamine and an alpha, beta-unsaturated compound of the formula:

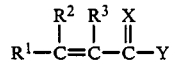

wherein X is sulfur or oxygen, Y is $-OR^4$, $-SR^4$, or $-NR^4(R^5)$, and $R^1$, $R^2$, $R^3$, $R^4$ and $R^5$ are the same or different and are hydrogen or substituted or unsubstituted hydrocarbyl.

2. The dispersant mixture according to claim 1, wherein said polyamine comprises amines containing from 2 to 60 carbon atoms and from 3 to 12 nitrogen atoms per molecule.

3. The dispersant mixture according to claim 2, wherein said amine comprises a polyalkylenepolyamine wherein said alkylene groups each contain 2 to 6 carbons and said polyalkylenepolyamine contains from 5 to about 9 nitrogen atoms per molecule.

4. The dispersant mixture according to claim 1, wherein said hydrocarbyl substituted $C_4$ to $C_{10}$ monounsaturated dicarboxylic acid producing material comprises polyisobutylene of about 900 to 5000 number average molecular weight substituted with succinic anhydride moieties, said polyamine comprises polyalkylene-polyamine wherein said alkylene groups contain 2 to 6 carbons and said polyalkylenepolyamine contains 5 to 9 nitrogen atoms per molecule, and said alpha, beta-unsaturated compound comprises at least one member selected from the group consisting of methyl acrylate, ethyl acrylate, propyl acrylate, butyl acrylate, methyl methacrylate, ethyl methacrylate, propyl methacrylate, and butyl methacrylate.

5. The dispersant mixture according to claims 1 or 4, wherein said polyamine comprises polyethylenepolyamine or polypropyleneamine and said dispersant mixture is borated.

6. The dispersant mixture according to claims 1 or 4, wherein said adduct contains about 0.05 to 2.0 weight percent boron.

7. The dispersant mixture according to claims 1 or 4, wherein said olefin polymer comprises polyisobutylene.

8. The dispersant mixture of any one of claims 1 to 5, wherein the ratio of acid producing moieties per molecule of olefin polymer in said dispersant mixture is from about 1.05 to 1.8.

9. The dispersant mixture of claim 8, wherein said number average molecular weight of said olefin polymer is from about 1300 to 4,000.

10. The dispersant mixture of claim 1, wherein said monounsaturated acid material comprises maleic anhydride.

11. The dispersant mixture according to claims 1 or 4 wherein about 1 to 5 moles of said acid producing material dicarboxylic acid moiety content are employed per primary nitrogen equivalent of said amido-amine.

12. The dispersant mixture according to claims 1 or 4 wherein said polyamine contains an average of at least 2 primary nitrogen atoms per molecule, said X group is oxygen and said polyamine and said alpha, beta-unsaturated compound are contacted in an amount of from about 3 to 5 equivalents of said polyamine (based on said primary amine content) per mole of said alpha, beta-unsaturated compound.

13. The dispersant mixture according to claim 12 wherein said amido-amine contains an average of from 1 to 3 amido groups per molecule of said amido-amine.

14. The dispersant mixture according to claims 1 or 4 wherein said polyamine contains an average of at least 2 primary nitrogen atoms per molecule, said X group is sulfur and said polyamine and said alpha, beta-unsaturated compound are contacted in an amount of from about 3 to 5 equivalents of said polyamine (based on said primary amine content) per mole of said alpha, beta-unsaturated compound.

15. The dispersant mixture according to claim 14 wherein said amido-amine contains an average of from 1 to 3 amido groups per molecule of said amido-amine.

16. A process for producing a dispersant mixture useful as an oil additive which comprises:
(a) providing a hydrocarbyl substituted $C_4$ to $C_{10}$ monoolefin having a number average molecular weight of about 700 to 10,000 and a $C_4$ to $C_{10}$ monounsaturated acid material, said acid producing material having an average of at least about 0.8 dicarboxylic acid producing moieties, per molecule of said olefin polymer present in the reaction mixture used to form said acid producing material;
(b) providing an amido-amine compound having at least one primary amino group prepared by reacting at least one polyamine with at least one alpha, beta-unsaturated compound of the formula:

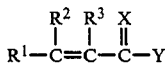

wherein X is sulfur or oxygen, Y is $-OR^4$, $-SR^4$, or $-NR^4(R^5)$, and $R^1$, $R^2$, $R^3$, $R^4$ and $R^5$ are the same or different and are hydrogen or substituted or unsubstituted hydrocarbyl; and
(c) contacting the said acid producing material with said amido-amine compound under conditions sufficient to effect reaction of at least a ortion of the primary amino groups on said amido-amine compound with at least a portion of the acid-producing groups in said acid producing material, to form said dispersant mixture.

17. The process according to claim 16 wherein said polyamine comprises amines containing from 2 to 60 carbon atoms and from 3 to 12 nitrogen atoms per molecule.

18. The process according to claim 17, wherein said amine comprises a polyalkylenepolyamine wherein said alkylene groups each contain 2 to 40 carbons and said polyalkylenepolyamine contains from 5 to about 9 nitrogen atoms per molecule.

19. The process according to claim 16, wherein said hydrocarbyl substituted $C_4$ to $C_{10}$ monounsaturated dicarboxylic acid producing material comprises polyisobutylene of about 900 to 5000 number average molecular weight substituted with succinic anhydride moieties, said polyamine comprises polyalkylenepolyamine wherein said alkylene groups contain 2 to 6 carbons and said polyalkylenepolyamine contains 5 to 9 nitrogen atoms per molecule, and said acrylate-type compound comprises at least one member selected from the group consisting of methyl acrylate, ethyl acrylate, propyl acrylate, butyl acrylate, methyl methacrylate, ethyl methacrylate, propyl methacrylate, and butyl methacrylate.

20. The process according to claims 16 or 19, wherein said polyamine comprises polyethylenepolyamine and wherein said dispersant mixture is borated.

21. The process according to claims 16 or 19, wherein said dispersant mixture is borated to provide from 0.05 to 2.0 weight percent boron in said borated dispersant mixture.

22. The process of claim 16, wherein the ratio of acid producing moieties per molecule of olefin polymer in said dispersant mixture is from about 1.05 to 1.8.

23. The process of claim 20, wherein said number average molecular weight of said olefin polymer is from about 1300 to 4,000.

24. The process of claim 16, wherein said monounsaturated acid material comprises maleic anhydride.

25. A concentrate containing from about 3 to 45 wt. % of the dispersant mixture of claim 1.

26. A concentrate containing from about 10 to 35 wt. % of the dispersant mixture of claim 4.

27. A lubricating oil composition containing from about 0.1 to 20 wt. % of the dispersant mixture prepared according to claim 16.

28. A process for producing a dispersant useful as an oil additive which comprises:
(a) providing a hydrocarbyl substituted $C_4$ to $C_{10}$ monoolefin having a number average molecular weight of about 700 to 10,000 and a $C_4$ to $C_{10}$ monounsaturated acid material, said acid producing material having an average of at least about 0.8 dicarboxylic acid producing moieties, per molecule of said olefin polymer present in the reaction mixture used to form said acid producing material;
(b) providing an amido-amine compound having at least one primary amino group prepared by reacting at least one polyamine with at least one alpha, beta-unsaturated compound of the formula:

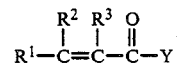

wherein Y is $-OR^4$, $-SR^4$, or $-NR^4 (R^5)$, and $R^1$, $R^2$, $R^3$, $R^4$ and $R^5$ are the same or different and are hydrogen or substituted or unsubstituted hydrocarbyl; and
(c) contacting the said acid producing material with said amido-amine compound under conditions sufficient to effect reaction of at least a portion of the primary amino groups on said amido-amine compound with at least a portion of the acid-producing groups in said acid producing material, to form said dispersant.

29. The process according to claim 28 wherein said polyamine comprises amines containing from 2 to 60 carbon atoms and from 3 to 12 nitrogen atoms per molecule.

30. The process according to claim 29, wherein said amine comprises a polyalkylenepolyamine wherein said alkylene groups each contain 2 to 6 carbons and said polyalkylenepolyamine contains from 5 to about 9 nitrogen atoms per molecule.

31. The process according to claim 28, wherein said hydrocarbyl substituted $C_4$ to $C_{10}$ monounsaturated dicarboxylic acid producing material comprises polyisobutylene of about 900 to 5000 number average molecular weight substituted with succinic anhydride moieties, said polyamine comprises polyalkylenepolyamine wherein said alkylene groups contain 2 to 6 carbons and said polyalkylenepolyamine contains 5 to 9 nitrogen atoms per molecule, and said acrylate-type compound comprises at least one member selected from the group consisting of methyl acrylate, ethyl acrylate, propyl acrylate, butyl acrylate, methyl methacrylate, ethyl methacrylate, propyl methacrylate, and butyl methacrylate.

32. The process according to claims 28 or 31, wherein said polyamine comprises polyethylenepolyamine and wherein said dispersant is borated.

33. The process according to claims 28 or 31, wherein said dispersant is borated to provide from about 0.05 to 2.0 weight percent boron in said borated dispersant.

34. The process according to claim 28, wherein said olefin polymer comprises polyisobutylene.

35. The process of claim 28, wherein the ratio of acid producing moieties per molecule of olefin polymer in said dispersant is from about 1.05 to 1.8.

36. The process of claim 32, wherein said number average molecular weight of said olefin polymer is from about 1300 to 4,000.

37. The process of claim 28, wherein said monounsaturated acid material comprises maleic anhydride.

38. A lubricating oil composition containing from about 0.1 to 20 wt. % of the dispersant prepared according to claim 28.

39. The process according to claim 16, wherein said olefin polymer comprises polyisobutylene.

* * * * *